(12) United States Patent
Sakhnini et al.

(10) Patent No.: US 11,576,213 B2
(45) Date of Patent: Feb. 7, 2023

(54) RANDOM ACCESS CHANNEL TRANSMISSION PROCEDURES IN HIGHER BANDS

(71) Applicant: QUALCOMM Incorporated, San Diego, CA (US)

(72) Inventors: Iyab Issam Sakhnini, San Diego, CA (US); Jing Sun, San Diego, CA (US); Tao Luo, San Diego, CA (US); Zhifei Fan, San Diego, CA (US); Arumugam Chendamarai Kannan, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/248,334

(22) Filed: Jan. 20, 2021

(65) Prior Publication Data

US 2021/0266978 A1 Aug. 26, 2021

Related U.S. Application Data

(60) Provisional application No. 62/980,663, filed on Feb. 24, 2020.

(51) Int. Cl.
*H04W 74/08* (2009.01)
*H04W 72/04* (2009.01)
*H04L 5/00* (2006.01)

(52) U.S. Cl.
CPC ......... *H04W 74/0833* (2013.01); *H04L 5/001* (2013.01); *H04W 72/042* (2013.01); *H04W 74/0891* (2013.01)

(58) Field of Classification Search
CPC ......... H04W 74/0833; H04W 74/0891; H04W 72/042; H04L 5/001
See application file for complete search history.

(56) References Cited

U.S. PATENT DOCUMENTS 9,301,323 B2 * 3/2016 Zhao ............... H04W 74/0858
10,425,973 B2 * 9/2019 Patel ..................... H04W 52/16
(Continued)

FOREIGN PATENT DOCUMENTS

WO 2020034564 A1 2/2020

OTHER PUBLICATIONS

International Search Report and Written Opinion—PCT/US2021/070085—ISA/EPO—dated May 17, 2021.

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a base station may transmit, and a user equipment (UE) may receive, initial timing advance information in a msg2 communication of a four-step random access channel procedure based at least in part on a subcarrier spacing in a cell associated with the base station. The UE may transmit, and the base station may receive, a msg3 communication with an initial timing advance that is based at least in part on the initial timing advance information. The base station may transmit, and the UE may receive, updated timing advance information resolving a timing advance wrap-around between the UE and the base station based at least in part on the base station detecting the msg3 communication. Numerous other aspects are provided.

30 Claims, 13 Drawing Sheets

(56) References Cited

U.S. PATENT DOCUMENTS

2018/0176958 A1\* 6/2018 Islam .................. H04W 72/046
2020/0187264 A1\* 6/2020 Charbit ............. H04W 74/0833
2021/0045163 A1\* 2/2021 Chai .................. H04L 27/2646

\* cited by examiner

RANDOM ACCESS CHANNEL TRANSMISSION PROCEDURES IN HIGHER BANDS

CROSS-REFERENCE TO RELATED APPLICATION

This Patent Application claims priority to U.S. Patent Application No. 62/980,663, filed on Feb. 24, 2020, entitled "RANDOM ACCESS CHANNEL TRANSMISSION PROCEDURES IN HIGHER BANDS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for random access channel (RACH) transmission procedures in higher bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving, from a base station, initial timing advance information in a msg2 communication of a four-step random access channel (RACH) procedure based at least in part on a subcarrier spacing in a cell associated with the base station; transmitting, to the base station, a msg3 communication with an initial timing advance that is based at least in part on the initial timing advance information; and receiving, from the base station, updated timing advance information resolving a timing advance wrap-around between the UE and the base station based at least in part on the base station detecting the msg3 communication.

In some aspects, a method of wireless communication, performed by a base station, may include transmitting, to a UE, initial timing advance information in a msg2 communication of a four-step RACH procedure based at least in part on a subcarrier spacing in a cell associated with the base station; receiving, from the UE, a msg3 communication with an initial timing advance that is based at least in part on the initial timing advance information; and transmitting, to the UE, updated timing advance information resolving a timing advance wrap-around between the UE and the base station based at least in part on the base station detecting the msg3 communication.

In some aspects, a UE for wireless communication may include a memory and one or more processors operatively coupled to the memory. The memory and the one or more processors may be configured to: receive, from a base station, initial timing advance information in a msg2 communication of a four-step RACH procedure based at least in part on a subcarrier spacing in a cell associated with the base station; transmit, to the base station, a msg3 communication with an initial timing advance that is based at least in part on the initial timing advance information; and receive, from the base station, updated timing advance information resolving a timing advance wrap-around between the UE and the base station based at least in part on the base station detecting the msg3 communication.

In some aspects, a base station for wireless communication may include a memory and one or more processors operatively coupled to the memory. The memory and the one or more processors may be configured to: transmit, to a UE, initial timing advance information in a msg2 communication of a four-step RACH procedure based at least in part on a subcarrier spacing in a cell associated with the base station; receive, from the UE, a msg3 communication with an initial timing advance that is based at least in part on the initial timing advance information; and transmit, to the UE, updated timing advance information resolving a timing advance wrap-around between the UE and the base station based at least in part on the base station detecting the msg3 communication.

In some aspects, a non-transitory computer-readable medium may store one or more instructions for wireless communication. The one or more instructions, when executed by one or more processors of a UE, may cause the one or more processors to: receive, from a base station, initial timing advance information in a msg2 communication of a four-step RACH procedure based at least in part on a subcarrier spacing in a cell associated with the base station; transmit, to the base station, a msg3 communication with an initial timing advance that is based at least in part on the initial timing advance information; and receive, from the base station, updated timing advance information resolving a timing advance wrap-around between the UE and the base station based at least in part on the base station detecting the msg3 communication.

In some aspects, a non-transitory computer-readable medium may store one or more instructions for wireless communication. The one or more instructions, when executed by one or more processors of a base station, may cause the one or more processors to transmit, to a UE, initial timing advance information in a msg2 communication of a four-step RACH procedure based at least in part on a subcarrier spacing in a cell associated with the base station; receive, from the UE, a msg3 communication with an initial timing advance that is based at least in part on the initial timing advance information; and transmit, to the UE, updated timing advance information resolving a timing advance wrap-around between the UE and the base station based at least in part on the base station detecting the msg3 communication.

In some aspects, an apparatus for wireless communication may include: means for receiving, from a base station, initial timing advance information in a msg2 communication of a four-step RACH procedure based at least in part on a subcarrier spacing in a cell associated with the base station; means for transmitting, to the base station, a msg3 communication with an initial timing advance that is based at least in part on the initial timing advance information; and means for receiving, from the base station, updated timing advance information resolving a timing advance wrap-around between the apparatus and the base station based at least in part on the base station detecting the msg3 communication.

In some aspects, an apparatus for wireless communication may include: means for transmitting, to a UE, initial timing advance information in a msg2 communication of a four-step RACH procedure based at least in part on a subcarrier spacing in a cell associated with the apparatus; means for receiving, from the UE, a msg3 communication with an initial timing advance that is based at least in part on the initial timing advance information; and means for transmitting, to the UE, updated timing advance information resolving a timing advance wrap-around between the UE and the apparatus based at least in part on the apparatus detecting the msg3 communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
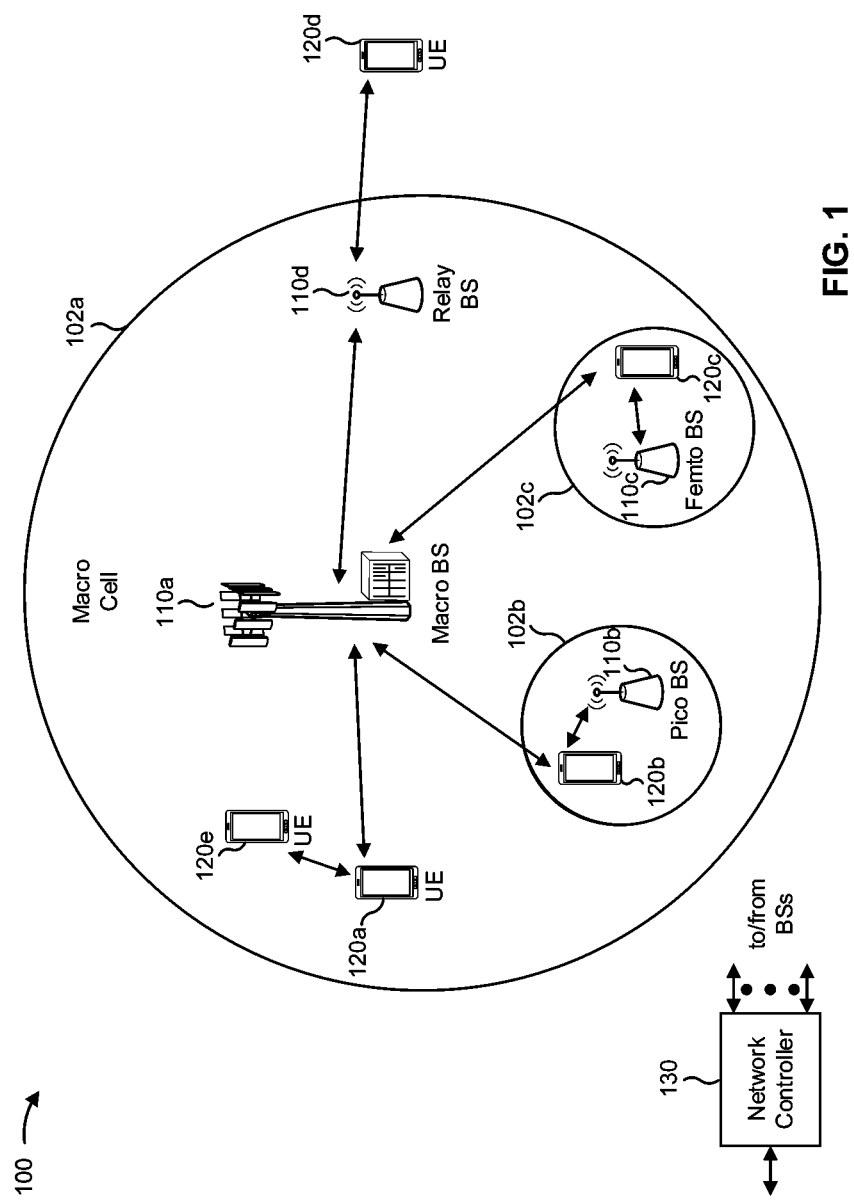
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, and/or channels. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6 GHz to 114.25 GHz, and/or may communicate using an operating band having a fifth frequency range (FR5), which may include frequencies higher than 114.25 GHz (e.g., sub-terahertz), among other examples. Note that FR3 is between FR1 and FR2, and FR4 and FR5 are above FR2. The frequencies between FR1 and FR2 (e.g., in FR3) are sometimes referred to as mid-band frequencies or a "sub-centimeter wave" band. Although a portion of FR1 is greater than 6 GHz, FR1 is often referred to as a "sub-6 GHz" band. Similarly, FR2, FR4, and/or the like are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, mid-band frequencies (e.g., greater than 7.125 GHz), and/or the like. Similarly, unless specifically stated otherwise, it should be understood that the term "millimeter wave" or the like, if used herein, may broadly represent frequencies within the EHF band, frequencies within FR2, FR4, and/or FR5, mid-band frequencies (e.g., less than 24.25 GHz), and/or the like. Furthermore, it is contemplated that the frequencies included in FR1, FR2, FR3, FR4, FR5, and/or the like may be modified, and techniques described herein are applicable to those modified frequency ranges.

As indicated above, FIG. 1 is provided as an example. Other examples may differ from what is described with regard to FIG. 1.

Figure 2:
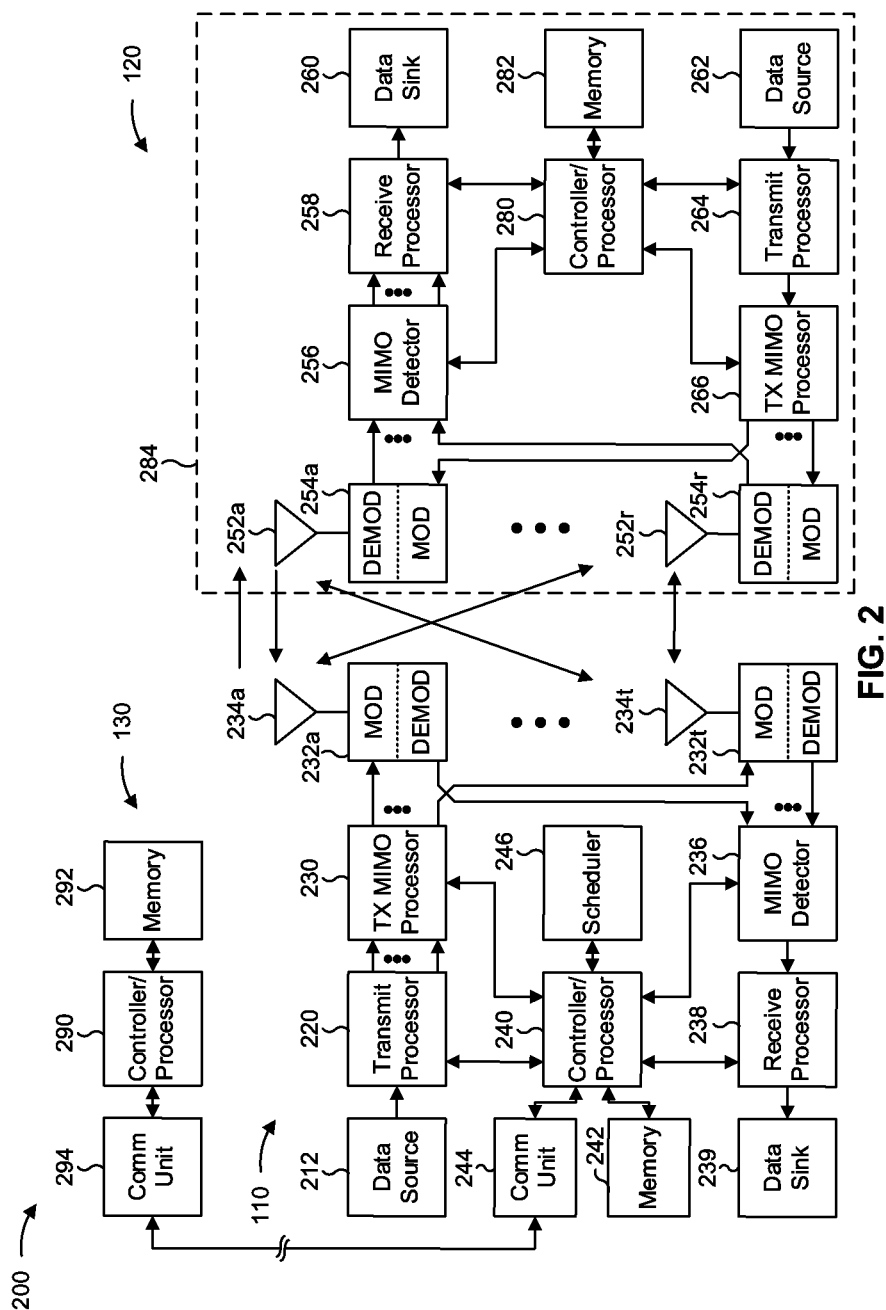
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9 and/or FIGS. 10A-10B.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9 and/or FIGS. 10A-10B.

Controller/processor 240 of base station 110, controller/processor 280 of UE 120, and/or any other component(s) of FIG. 2 may perform one or more techniques associated with random access channel (RACH) transmission procedures in higher bands, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for receiving, from base station 110, initial timing advance information in a msg2 communication of a four-step RACH procedure based at least in part on a subcarrier spacing in a cell associated with base station 110, means for transmitting, to base station 110, a msg3 communication with an initial timing advance that is based at least in part on the initial timing advance information, means for receiving, from base station 110, updated timing advance information resolving a timing advance wrap-around between UE 120 and base station 110 based at least in part on the base station detecting the msg3 communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, initial timing advance information in a msg2 communication of a four-step RACH procedure based at least in part on a subcarrier spacing in a cell associated with base station 110, means for receiving, from UE 120, a msg3 communication with an initial timing advance that is based at least in part on the initial timing advance information, means for transmitting, to UE 120, updated timing advance information resolving a timing advance wrap-around between UE 120 and base station 110 based at least in part on base station 110 detecting the msg3 communication, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
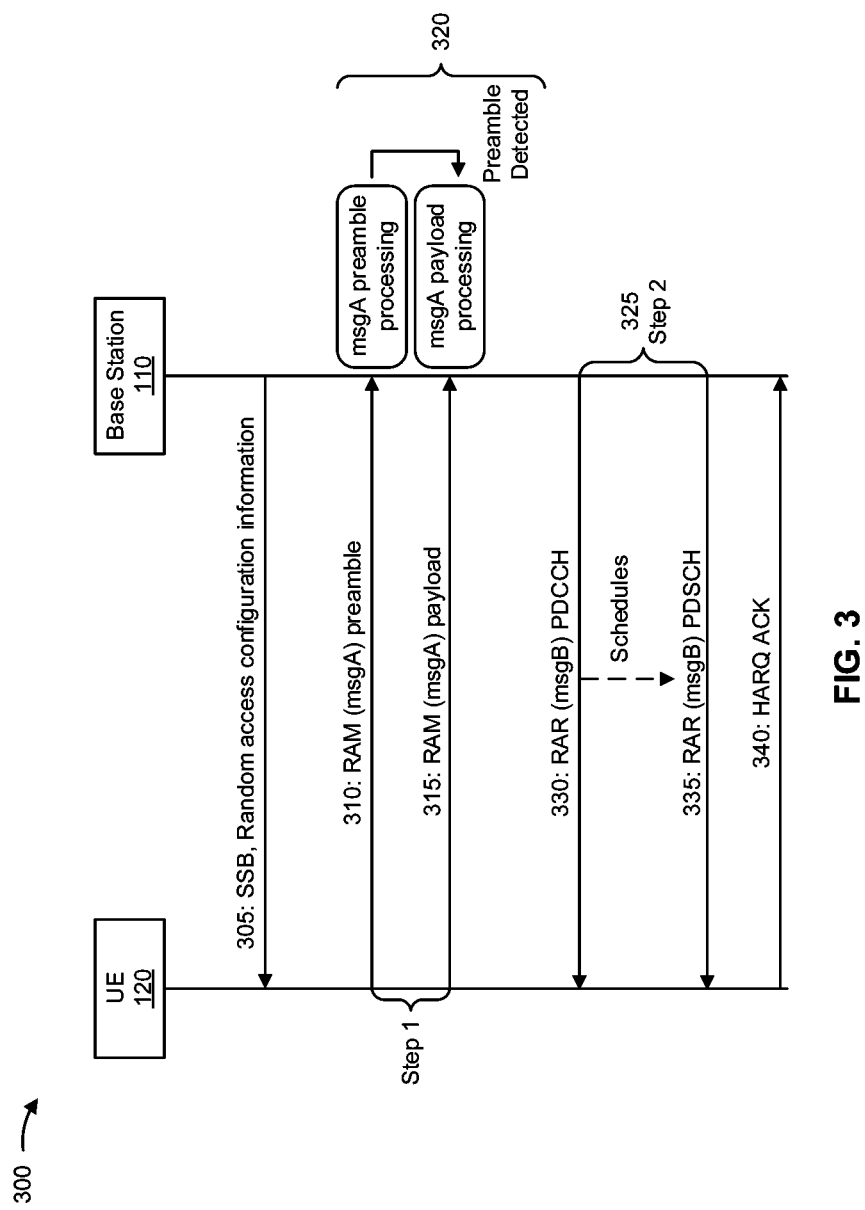
FIG. 3 is a diagram illustrating an example of a two-step random access channel (RACH) procedure, in accordance with the present disclosure.

FIG. 3 is a diagram illustrating an example 300 of a two-step RACH procedure, in accordance with the present disclosure. As shown in FIG. 3, a base station 110 and a UE 120 may communicate with one another in a wireless network (e.g., wireless network 100) to perform the two-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB. Additionally, or alternatively, the random access configuration information may be transmitted in a radio resource control (RRC) message. The random access configuration information may include one or more parameters to be used in the two-step RACH procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, an initial message, and/or the like in a two-step RACH procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a msgA physical uplink shared channel (PUSCH), a payload, and/or the like. In some aspects, the RAM may include some or all of the contents of message 1 (msg1) and message 3 (msg3) of a four-step RACH procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a PUSCH transmission, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, timing advance information (e.g., a timing advance value, a timing advance command, and/or the like), contention resolution information, and/or the like.

As shown by reference number 330, as part of the second step of the two-step RACH procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step RACH procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
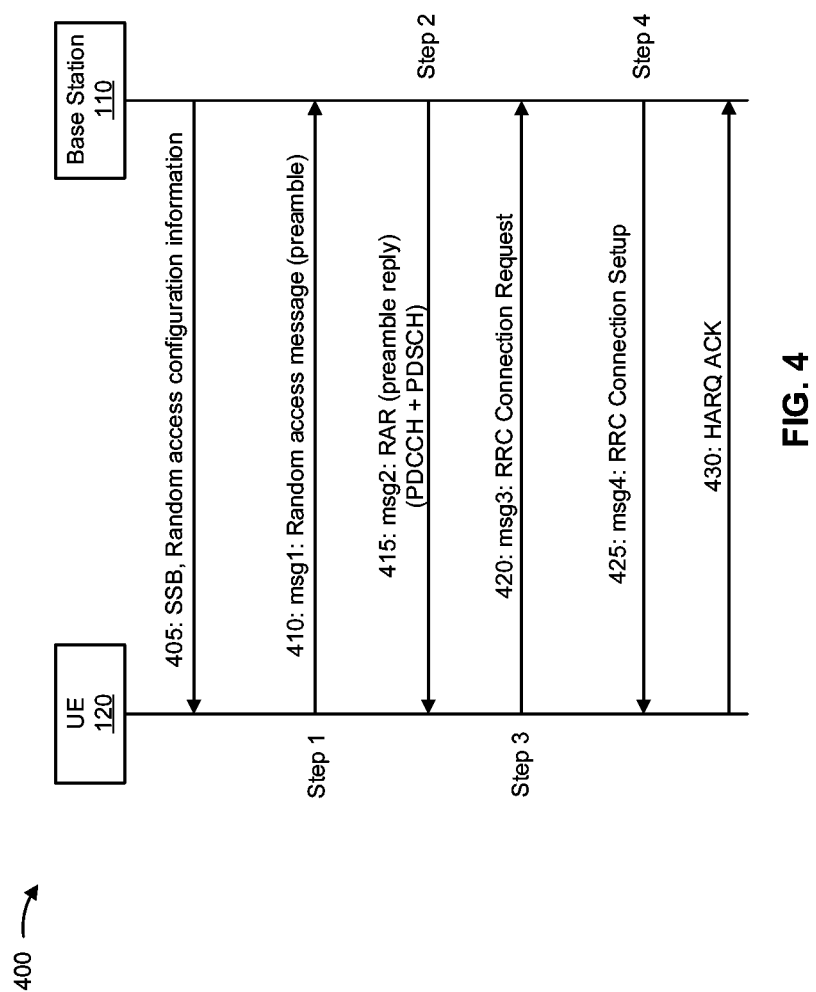
FIG. 4 is a diagram illustrating an example of a four-step RACH procedure, in accordance with the present disclosure.

FIG. 4 is a diagram illustrating an example 400 of a four-step RACH procedure, in accordance with the present disclosure. As shown in FIG. 4, a base station 110 and a UE 120 may communicate with one another in a wireless network (e.g., wireless network 100) to perform the four-step RACH procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs and/or the like) and/or an SSB. Additionally, or alternatively, the random access configuration information may be transmitted in an RRC message. The random access configuration information may include one or more parameters to be used in the RACH procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step RACH procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step RACH procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, timing advance information (e.g., a timing advance value, a timing advance command, and/or the like), contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

Figure 5:
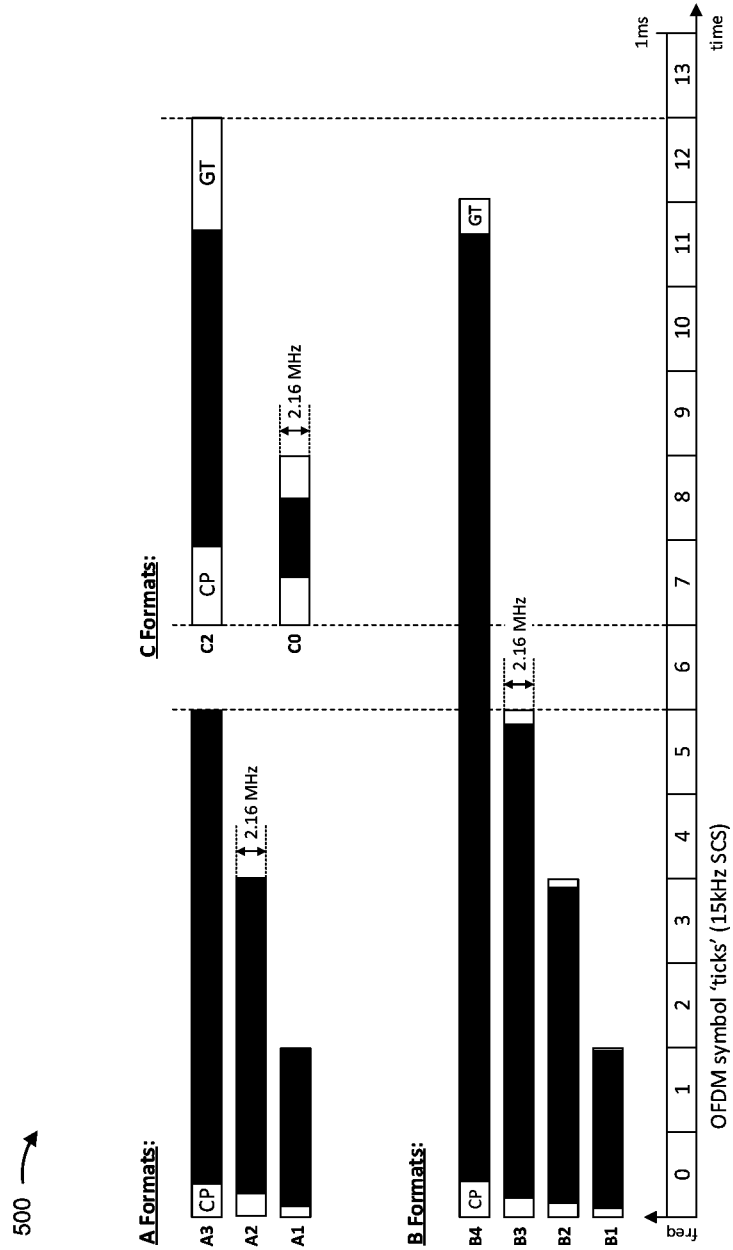
FIG. 5 is a diagram illustrating one or more examples of physical RACH (PRACH) preamble formats that may be used in a two-step or four-step RACH procedure, in accordance with the present disclosure.

FIG. 5 is a diagram illustrating one or more examples 500 of PRACH preamble formats that may be used in a two-step RACH procedure or a four-step RACH procedure, in accordance with the present disclosure. For example, as described above, an initial uplink RACH communication transmitted from a UE to a base station (e. g, a msg1 communication in a four-step RACH procedure, a preamble portion of a msgA communication, and/or the like) may include a preamble sequence that is generated or selected by the UE. The UE and the base station may use the preamble sequence to uniquely identify the UE during the RACH procedure. For example, the base station may use the preamble sequence and a random access radio network temporary identifier (RA-RNTI) to address a downlink RACH communication to the UE (e.g., a msg2 communication in a four-step RACH procedure, a msgB communication in a two-step RACH procedure, and/or the like).

In general, the preamble sequence transmitted in the initial uplink RACH communication may have a long sequence format or a short sequence format, and permitted formats for the preamble sequence may depend on one or more factors such as a frequency band, a bandwidth, a subcarrier spacing, and/or the like used for communication between the UE and the base station. For example, in FIG. 5, the illustrated PRACH preamble formats each have a short sequence format in which a cyclic prefix precedes a preamble sequence transmitted in one or more repetitions, and further in which an optional guard time may follow the one or more repetitions of the preamble sequence. In general, a duration of the cyclic prefix, a quantity of the repetitions of the preamble sequence, and a duration of the guard time (if present) may vary among the different PRACH preamble formats, which are configured to be time-aligned with an OFDM symbol boundary used for data transmissions with the same numerology as the PRACH preamble. For example, the following table provides configuration details for the various short PRACH preambles illustrated in FIG. 5 in cases where the short PRACH preambles all have a length of 139 bits, a subcarrier spacing is 15 kHz, and a communication bandwidth is 2.16 MHz.

prefix aggregated at the beginning of a burst and with or without a guard time at the end of the burst. The cyclic prefix and the guard time may typically be constrained to not be longer than the sequence, for example, to avoid a timing advance wrap-around that may create ambiguity relating to an OFDM symbol boundary expected to be time-aligned with the PRACH preamble. However, the cyclic prefix and guard time are included in the PRACH preamble to account for a round-trip delay in a cell and a delay spread due to multi-path propagation, whereby the cyclic prefix and the guard time need to be long enough to absorb the round-trip delay, the delay spread, and/or the like. In this regard, the supported cell size may generally depend on the cyclic prefix duration (e.g., a longer cyclic prefix duration may absorb a larger round-trip delay and delay spread, and thus support a larger cell size). In a similar respect, to support a target cell size, supported PRACH preamble formats may be limited to PRACH preamble formats with a cyclic prefix duration that is sufficiently long to absorb the expected round-trip delay, delay spread, and/or the like in a cell having the target cell size.

This may create challenges, however, in higher frequency bands (e.g., greater than 52.6 GHz, up to 71 GHz, and/or the like) where a large subcarrier spacing (e.g., 960 kHz, 1.9 MHz, 3.8 MHz, and/or the like) may be needed to support a larger bandwidth with the same Fast Fourier transform (FFT) size as lower frequency bands. Accordingly, although the short PRACH preamble formats can generally be proportionately scaled according to the subcarrier spacing (e.g., where a larger subcarrier spacing generally leads to a shorter symbol duration), scaling at the larger subcarrier spacing(s) expected to be used in higher frequency bands may significantly reduce the cyclic prefix duration and therefore the supportable cell size. For example, at a subcarrier spacing of 960 kHz, the cyclic prefix in a PRACH preamble having format A1 would have a duration of 0.146 μs, the cyclic prefix and guard time in a PRACH preamble having format B1 would have respective durations of 0.11 μs and 0.037 μs, and/or the like. As a result, the shorter cyclic prefix and the shorter guard time in a proportionately scaled short PRACH preamble would substantially limit the supportable round-trip time and/or delay spread, and therefore the supportable cell size.

Some aspects described herein relate to techniques and apparatuses that may implement one or more RACH procedures to increase the supportable cell size in higher bands

TABLE 1

Short PRACH preamble formats

| Preamble format | 1 sequence duration (μs) | Sequence repetitions | Total sequence duration (μs) | CP duration (μs) | GT duration (μs) | Total duration (μs) | OFDM symbols |
|---|---|---|---|---|---|---|---|
| A1 | 66.67 | 2 | 133.33 | 9.375 | 0 | 142.71 | 2 |
| A2 | 66.67 | 4 | 266.67 | 18.75 | 0 | 285.42 | 4 |
| A3 | 66.67 | 6 | 400 | 28.125 | 0 | 428.13 | 6 |
| B1 | 66.67 | 2 | 133.33 | 7.031 | 2.344 | 142.71 | 2 |
| B2 | 66.67 | 4 | 266.67 | 11.719 | 7.031 | 285.42 | 4 |
| B3 | 66.67 | 6 | 40 | 16.406 | 11.719 | 428.125 | 6 |
| B4 | 66.67 | 12 | 800 | 30.469 | 25.781 | 856.25 | 12 |
| C0 | 66.67 | 1 | 66.67 | 40.36 | 35.677 | 142.71 | 2 |
| C2 | 66.67 | 4 | 266.67 | 66.67 | 94.922 | 428.26 | 6 |

Accordingly, as shown in FIG. 5 and the table provided above, a PRACH preamble having a short format may generally cover 2, 4, 6, or 12 OFDM symbols with a cyclic by allowing the cyclic prefix to exceed a full symbol duration. For example, in the case of a four-step RACH procedure, allowing the cyclic prefix to exceed the full symbol duration may create a timing wrap-around in which a base station may be unable to distinguish a timing advance of t versus t+k/SCS, where the timing advance generally indicates an amount of time for an uplink communication to travel from a UE to the base station, t is a portion of the timing advance that is within a full symbol duration, SCS represents the subcarrier spacing used in the cell associated with the base station, and k is a non-negative integer having a value of {0, 1, . . . , M}. Accordingly, in the case of a four-step RACH procedure, the base station may transmit initial timing advance information including a value for t to the UE (e.g., in a msg2 communication), and subsequent messages (e.g., a msg2 retransmission, a msg3 transmission and/or retransmission, a msg3 PDCCH, a msg4 transmission, and/or the like) may be used to determine the value of k and thereby resolve the timing wrap-around. Alternatively, in the case of a two-step RACH procedure, the base station may determine the timing of t versus t+k/SCS based on a msgA PUSCH payload such that a correct timing advance can be indicated in a msgB communication without ambiguity. Accordingly, because the timing wrap-around issue beyond one symbol duration may be more pronounced in the four-step RACH procedure and unlikely to arise in the two-step RACH procedure, the base station may configure different PRACH parameters for the two-step and four-step RACH procedures. In this way, the base station may support a cell that can operate at a high frequency, a large subcarrier spacing, a large bandwidth, and/or the like without having to proportionately scale the PRACH preamble in a manner that may otherwise limit the supportable cell size due to the shorter symbol duration.

As indicated above, FIG. 5 is provided as an example. Other examples may differ from what is described with respect to FIG. 5.

Figure 6:
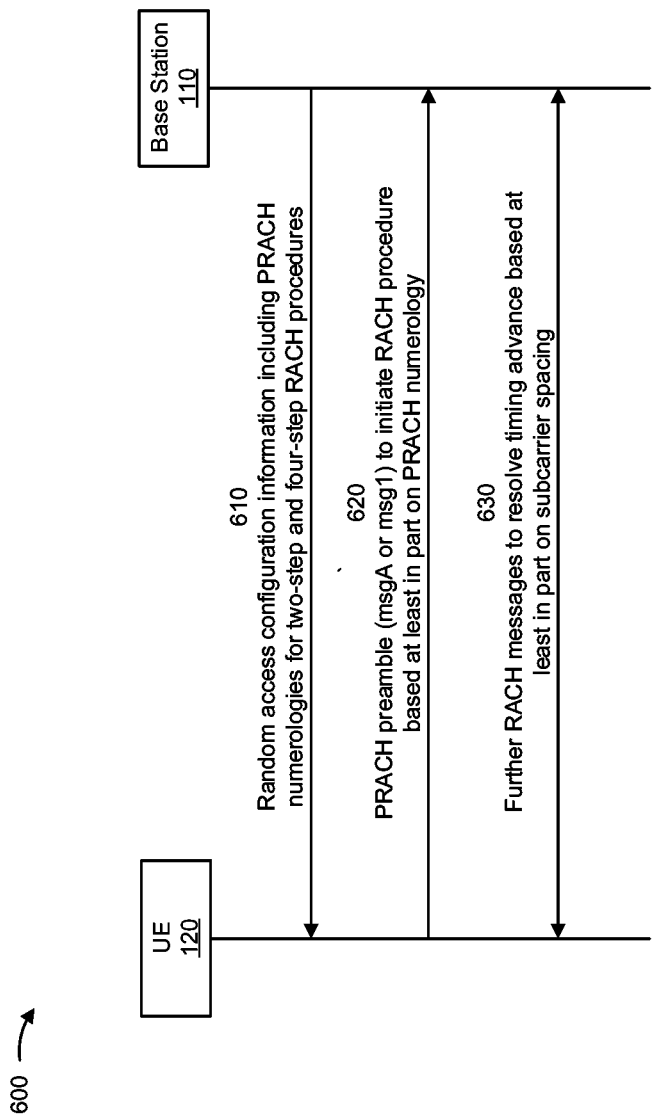
FIGS. 6-9 and 10A-10B are diagrams illustrating one or more examples of RACH transmission procedures in higher bands, in accordance with the present disclosure.

FIG. 6 is a diagram illustrating one or more examples 600 of RACH transmission procedures in higher bands, in accordance with the present disclosure. As shown in FIG. 6, a base station 110 and a UE 120 may communicate with one another in a wireless network (e.g., wireless network 100) to perform a two-step RACH procedure and/or a four-step RACH procedure.

As shown in FIG. 6, and by reference number 610, the base station 110 may transmit, and the UE 120 may receive, random access configuration information including PRACH numerologies for a two-step RACH procedure and four-step RACH procedure. In some aspects, the random access configuration information may be transmitted in and/or indicated by system information (e.g., in one or more SIBs and/or the like) and/or an SSB. Additionally, or alternatively, the random access configuration information may be transmitted in an RRC message. In general, as described above, the random access configuration information may include parameters to be used in the RACH procedure, such as parameters for transmitting a random access message, receiving a random access response (RAR) to the random access message, and/or the like. Furthermore, in some aspects, the random access configuration information may indicate different PRACH numerologies to be used in a cell associated with the base station for a two-step RACH procedure and four-step RACH procedure.

For example, as described above, the base station 110 and the UE 120 may communicate in a frequency associated with a subcarrier spacing that may cause a full symbol duration to be shorter than a cyclic prefix duration. In this case, a timing advance wrap-around may occur, whereby the base station 110 may be unable to distinguish a timing advance of t versus t+k/SCS, where t is a portion of the timing advance within a full symbol duration, SCS represents the subcarrier spacing used in the cell associated with the base station, and k is a non-negative integer having a value of {0, 1, . . . , M}. However, the timing wrap-around beyond one symbol duration may be more pronounced in the four-step RACH procedure and less likely to arise in the two-step RACH procedure because the base station 110 can determine the timing advance of t versus t+k/SCS according to the msgA PUSCH payload. Accordingly, because the base station 110 can determine the correct timing advance and indicate the correct timing advance in msgB without any ambiguity, the random access configuration provided to the UE may configure different PRACH parameters for the two-step and four-step RACH procedures.

For example, in some aspects, the PRACH numerology for the two-step RACH procedure may be the same as a numerology used for data transmissions, which may generally simplify processing by the base station 110. On the other hand, due to the potential for a timing advance wrap-around creating ambiguity in a timing advance, the four-step RACH procedure may be configured to use a PRACH numerology with a subcarrier spacing that is smaller than the subcarrier spacing otherwise used in the cell for data transmissions. Furthermore, when the cell associated with the base station supports the two-step RACH procedure and the four-step RACH procedure, two-step RACH occasions (ROs) and four-step ROs may use different PRACH numerologies (e.g., the two-step ROs may use the same PRACH numerology as data transmissions, and the four-step ROs may use a PRACH numerology based on a smaller subcarrier spacing to allow for a larger timing advance that may exceed a full symbol duration).

As further shown in FIG. 6, and by reference number 620, the UE 120 may transmit, and the base station 110 may receive, a PRACH preamble to initiate a RACH procedure based at least in part on a PRACH numerology associated with the RACH procedure. For example, in cases where the UE 120 initiates a two-step RACH procedure, the UE 120 may transmit a PRACH preamble in a msgA communication during a two-step RO using the PRACH numerology that is based on the same subcarrier spacing used in the cell for data transmissions. Alternatively, in cases where the UE 120 initiates a four-step RACH procedure, the UE 120 may transmit the PRACH preamble in a msg1 communication during a four-step RO using the PRACH numerology that is based on a smaller subcarrier spacing than the subcarrier spacing otherwise used in the cell for data transmissions.

As further shown in FIG. 6, and by reference number 630, the UE 120 and the base station 110 may exchange further RACH messages to resolve a timing advance between the UE 120 and the base station 110 based at least in part on the subcarrier spacing used in the cell associated with the base station 110. For example, as described above, the base station 110 may generally be unable to distinguish between a timing advance of t and a timing advance of t+k/SCS based solely upon the PRACH preamble because the random access configuration information indicates that a cyclic prefix of the PRACH preamble is permitted to exceed a full symbol duration. Accordingly, in the case of a two-step RACH procedure, the base station 110 may first detect the PRACH preamble with the ambiguous timing advance, and may resolve the timing wrap-around according to the msgA PUSCH payload. In this way, the base station may determine the value of k, which may be a non-negative integer, and may indicate the timing advance that the UE 120 is to use for subsequent uplink communications accordingly in a msgB communication without any ambiguity. Alternatively, in the case a four-step RAC procedure, the base station 110 may provide initial timing advance information to the UE 120 (e.g., in a msg2 communication), and subsequent RACH messages may be used to resolve the value of k such that the UE 120 may be provided with an updated timing advance to be used for subsequent uplink communications. Further details relating to different techniques that may be used in a four-step RACH procedure to resolve the value of k, and therefore the timing advance wrap-around between the UE 120 and the base station 110, are described below.

As indicated above, FIG. 6 is provided as an example. Other examples may differ from what is described with respect to FIG. 6.

Figure 7:
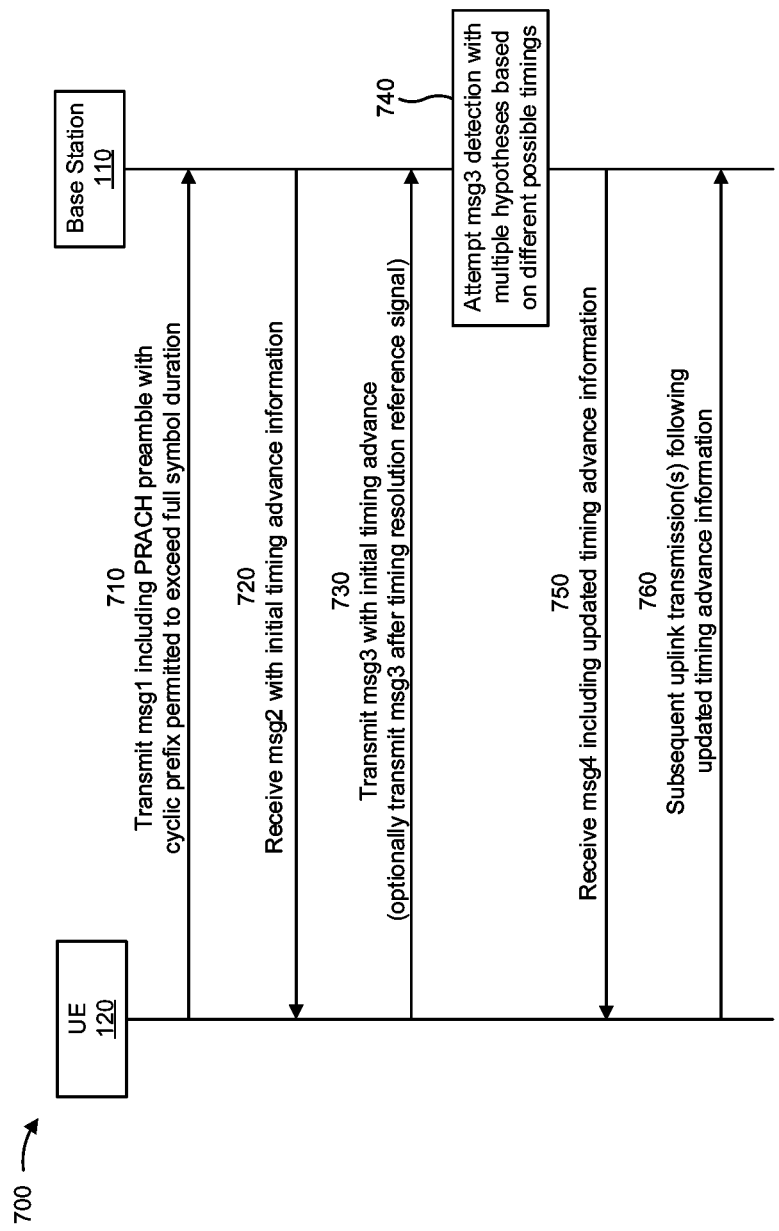

FIG. 7 is a diagram illustrating one or more examples 700 of RACH transmission procedures in higher bands, in accordance with the present disclosure. As shown in FIG. 7, a base station 110 and a UE 120 may communicate with one another in a wireless network (e.g., wireless network 100) to perform a four-step RACH procedure. Furthermore, as described herein, the four-step RACH procedure may be associated with a random access configuration that permits a PRACH preamble to have a cyclic prefix that exceeds a full symbol duration that depends on a subcarrier spacing used in a cell associated with the base station 110.

As shown in FIG. 7, and by reference number 710, the UE 120 may transmit, and the base station 110 may receive, a msg1 communication including a PRACH preamble that has a cyclic prefix and one or more repetitions of a sequence following the cyclic prefix. Furthermore, in some aspects, the PRACH preamble may include a guard time following the one or more repetitions of the sequence. For example, the PRACH preamble may have a short PRACH preamble format, such as any one of the short PRACH preamble formats illustrated in FIG. 5. In some aspects, as described above, the random access configuration may permit the cyclic prefix of the PRACH preamble to exceed a full symbol duration based at least in part on the subcarrier spacing used in the cell associated with the base station. For example, rather than proportionately scaling the cyclic prefix duration according to the subcarrier spacing, which may limit the supportable cell size, the cyclic prefix duration may exceed a full symbol duration and subsequent messages exchanged during the four-step RACH procedure may be used to resolve any timing ambiguity that may arise due to the cyclic prefix duration potentially exceeding a full symbol duration.

More particularly, as further shown in FIG. 7, and by reference number 720, the base station 110 may transmit, and the UE 120 may receive, a msg2 communication including a random access response (RAR) that provides initial timing advance information. For example, as described above, the base station 110 may receive the PRACH preamble at a particular time that enables the base station 110 to determine a timing advance, t, within the full symbol duration that depends on the subcarrier spacing used in the cell. However, because the PRACH preamble has a cyclic prefix that may (or may not) exceed the full symbol duration, the base station 110 may be unable to distinguish between the timing advance, t, within the full symbol duration, and a timing advance of t+k/SCS, where k is a non-negative integer with a value of {0, 1, . . . , M}. Accordingly, in some aspects, the msg2 communication transmitted to the UE 120 as a reply to the msg1 communication may indicate the value of t, which the base station 110 is able to detect unambiguously based on a time when the PRACH preamble is received, and subsequent RACH messages exchanged during the four-step RACH procedure may be used to resolve a value for k to determine the correct timing advance.

For example, as further shown in FIG. 7, and by reference number 730, the UE 120 may transmit a msg3 communication using the initial timing advance indicated in the msg2 communication. Accordingly, as shown by reference number 740, the base station 110 may attempt to detect the msg3 communication using multiple hypotheses that are based on different possible timing advances (e.g., different values for k). For example, in some aspects, the base station 110 may attempt to detect the msg3 communication using an initial hypothesis that assumes that the msg3 communication has an aligned timing (e.g., with k=0), and the base station 110 may further attempt to detect the msg3 communication using additional hypotheses (e.g., with k={1, . . . , M} until the msg3 communication is detected if the base station 110 fails to detect the msg3 communication with the initial hypothesis that assumes aligned timing. For example, in some aspects, the multiple hypotheses used to detect the msg3 communication may be performed over a demodulation reference signal (DMRS) associated with the msg3 communication, a DMRS and a PUSCH associated with the msg3 communication, and/or the like. In this way, the base station 110 may resolve the value for k, and thus the correct timing advance.

Additionally, or alternatively, as further shown by reference number 730, the UE 120 may optionally transmit a timing resolution reference signal to the base station 110 prior to transmitting the msg3 communication. In this case, the base station 110 may detect the correct timing advance (e.g., resolving the value for k) by applying the multiple timing hypotheses to the timing resolution reference signal and then proceeding to detect the msg3 communication according to the correct timing advance determined from the timing resolution reference signal. Furthermore, in some aspects, resources that are allocated to the msg3 communication (and the timing resolution reference signal, if used) may be configured to have one or more symbol gaps in time and one or more guard resource elements and/or resource blocks to mitigate potential interference with other (synchronized) uplink transmissions. For example, because the timing resolution reference signal and/or msg3 communication are transmitted with the initial timing advance indicated in the msg2 communication before the value of k has been resolved, the timing resolution reference signal and/or msg3 communication may not be correctly synchronized. Accordingly, the additional symbol gaps in time and the guard resource elements and/or resource blocks may be used to reduce potential interference with other uplink transmissions that are correctly synchronized.

As further shown in FIG. 7, and by reference number 750, the base station 110 may transmit, and the UE 120 may receive, a msg4 communication that includes updated timing advance information resolving any ambiguity between a timing advance oft and a timing advance wrap-around of t+k/SC S. For example, as described above, the base station 110 may determine the value of k depending on which of the multiple hypotheses resulted in the base station 110 successfully detecting the msg3 communication and/or the timing determined from the timing resolution reference signal. Accordingly, the base station 110 may signal the updated timing advance information in a msg4 PDSCH communication or a msg4 PDCCH communication scheduling the msg4 PDSCH communication. Furthermore, in some aspects, the base station 110 may signal only the resolved value of k (e.g., indicating a non-negative integer value) such that the UE 120 may add the appropriate time period to the initial timing advance indicated in the msg2 communication. For example, if the base station 110 signals that k=0 (e.g., based on detecting the msg3 communication with aligned timing), the updated timing advance may be the same as the initial timing advance. In another example, if the base station 110 signals that k=1 (e.g., based on detecting the msg3 communication misaligned by one full symbol duration), the UE 120 may add one full symbol duration to the initial timing advance indicated in the msg2 communication. Accordingly, as further shown in FIG. 7, and by reference number 760, subsequent uplink transmissions from the UE 120 to the base station 110, including an acknowledgement for the msg4 communication, may be transmitted according to the updated timing advance information.

As indicated above, FIG. 7 is provided as an example. Other examples may differ from what is described with respect to FIG. 7.

Figure 8:
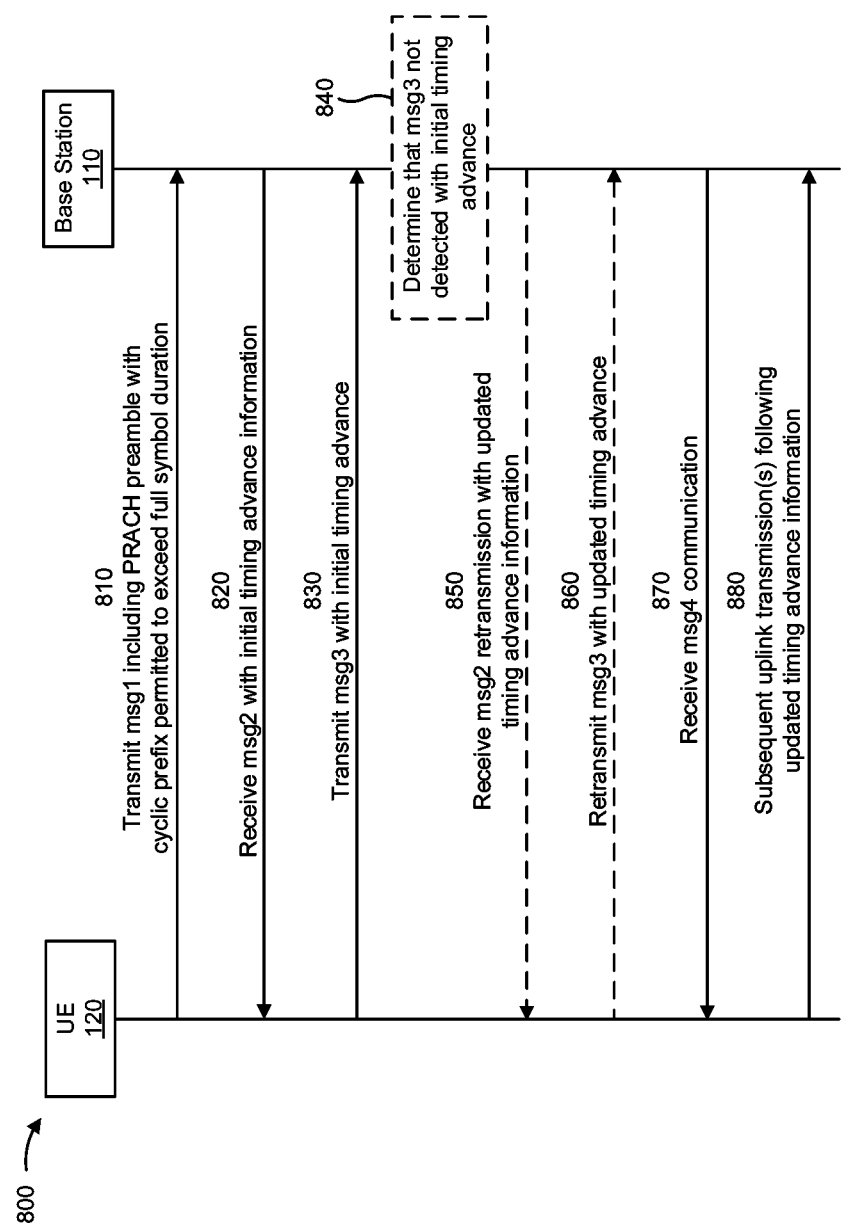

FIG. 8 is a diagram illustrating one or more examples 800 of RACH transmission procedures in higher bands, in accordance with the present disclosure. As shown in FIG. 8, a base station 110 and a UE 120 may communicate with one another in a wireless network (e.g., wireless network 100) to perform a four-step RACH procedure. Furthermore, as described herein, the four-step RACH procedure may be associated with a random access configuration that permits a PRACH preamble to have a cyclic prefix that exceeds a full symbol duration that depends on a subcarrier spacing used in a cell associated with the base station 110. In addition, the random access configuration may define a duration for a random access response (RAR) window that permits the UE 120 and the base station 110 to exchange multiple msg2 and msg3 communications until a correct timing advance is resolved.

As shown in FIG. 8, and by reference number 810, the UE 120 may transmit, and the base station 110 may receive, a msg1 communication including a PRACH preamble that has a cyclic prefix and one or more repetitions of a sequence following the cyclic prefix. Furthermore, in some aspects, the PRACH preamble may include a guard time following the one or more repetitions of the sequence. For example, the PRACH preamble may have a short PRACH preamble format, such as any one of the short PRACH preamble formats illustrated in FIG. 5. In some aspects, as described above, the random access configuration may permit the cyclic prefix of the PRACH preamble to exceed a full symbol duration based at least in part on the subcarrier spacing used in the cell associated with the base station. For example, rather than proportionately scaling the cyclic prefix duration according to the subcarrier spacing, which may limit the supportable cell size, the cyclic prefix duration may exceed a full symbol duration and subsequent messages exchanged during the four-step RACH procedure may be used to resolve any timing ambiguity that may arise due to the cyclic prefix duration potentially exceeding a full symbol duration.

As further shown in FIG. 8, and by reference number 820, the base station 110 may transmit, and the UE 120 may receive, a msg2 communication including a RAR that provides initial timing advance information. For example, as described above, the initial timing advance information may indicate a value of t, which is a timing advance within a full symbol duration that the base station 110 is able to detect unambiguously based on a time when the PRACH preamble is received. Accordingly, as further shown in FIG. 8, and by reference number 830, the UE 120 may transmit a msg3 communication using the initial timing advance indicated in the msg2 communication. Accordingly, as shown by reference number 840, the base station 110 may attempt to detect the msg3 communication with the initial timing advance (e.g., assuming that k has a value of 0). As further shown by reference number 850, the base station 110 may retransmit the msg2 communication with updated timing advance information (e.g., with k having a value of 1) if the base station 110 is unable to detect the msg3 communication with the initial timing advance.

Accordingly, as shown by reference number 860, the UE 120 may retransmit the msg3 communication with the updated timing advance. In some aspects, this exchange may be repeated until the base station 110 is able to successfully detect the msg3 communication. In some aspects, to permit the base station 110 to transmit multiple msg2 communications with different timing advances and allow the UE 120 to attempt multiple msg3 communications with different timing advances, the base station 110 may configure an extended RAR window for the msg2 communication. For example, in some aspects, the extended RAR window may generally have a duration that depends on a supported cell size, which may constrain possible values for k based on the potential round-trip delay and delay spread to be absorbed by the cyclic prefix. For example, the base station 110 may determine that possible values for k may be 0 or 1 for a first cell size, or that possible values fork may be 0, 1, or 2 for a larger cell size. In this regard, depending on the supported cell size, and therefore possible round-trip delays that may be experienced in the cell, the base station 110 may determine the number of possible hypotheses that may be needed to resolve the value of k and configure the RAR window duration accordingly. Furthermore, because the base station 110 may transmit multiple msg2 communications with different timing advances, the UE 120 may continue to monitor a downlink channel for the msg2 communication after transmitting the msg3 communication as a reply to a correctly detected msg2 communication.

As further shown in FIG. 8, and by reference number 870, the base station 110 may transmit, and the UE 120 may receive, a msg4 communication after the base station 110 is able to successfully detect the msg3 communication. For example, if the base station 110 is able to detect the msg3 communication with the initial timing advance, the base station 110 would not retransmit the msg2 communication and would instead transmit the msg4 communication as a reply to the msg3 communication transmitted with the initial timing advance. Alternatively, if the base station 110 is unable to detect the msg3 communication with the initial timing advance but successfully detects a subsequent msg3 communication with a different timing advance, the base station 110 would transmit the msg4 communication as a reply to the msg3 communication that was successfully detected. Accordingly, as further shown in FIG. 8, and by reference number 880, subsequent uplink transmissions from the UE 120 to the base station 110, including an acknowledgement for the msg4 communication, may be transmitted according to the updated timing advance information, which may correspond to the timing advance that was used for a msg3 communication that was successfully detected by the base station 110 (e.g., the msg3 communication transmitted by the UE 120 just prior to the msg4 communication).

As indicated above, FIG. 8 is provided as an example. Other examples may differ from what is described with respect to FIG. 8.

Figure 9:
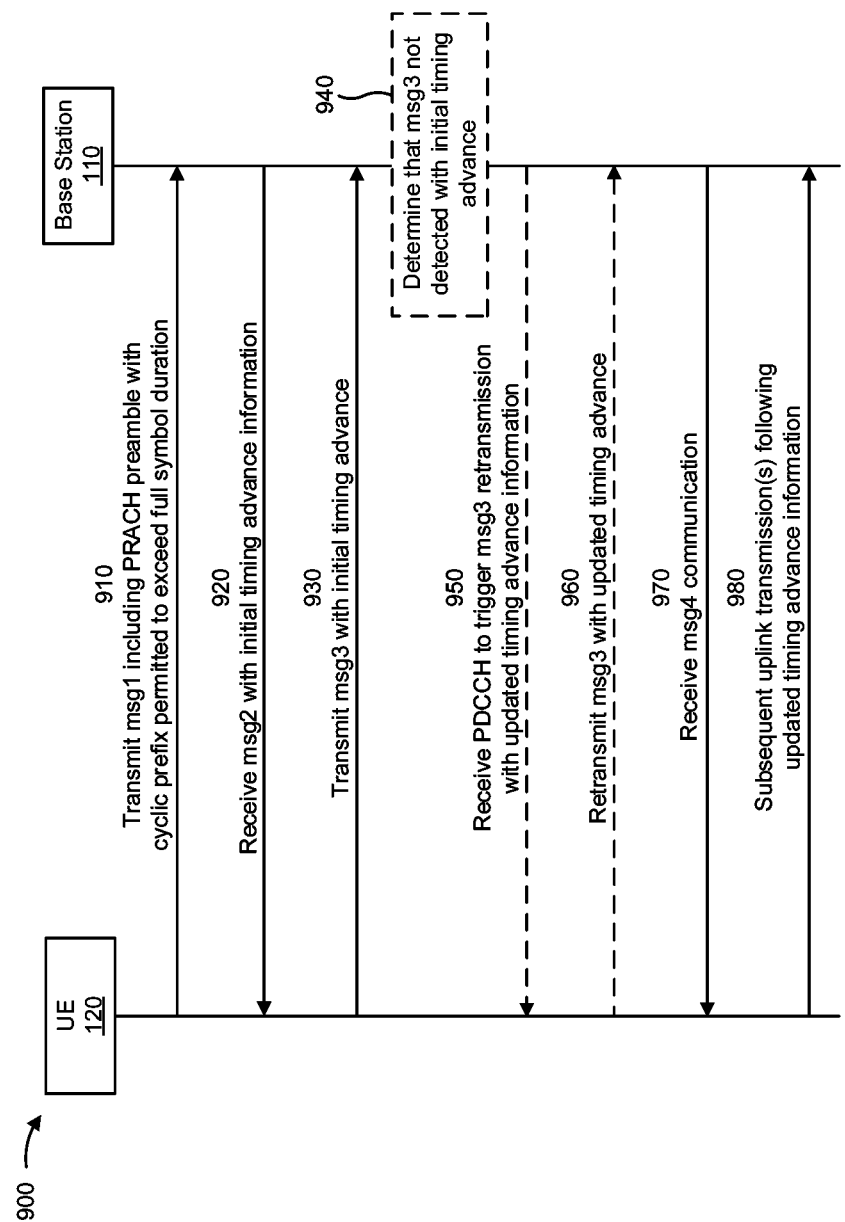

FIG. 9 is a diagram illustrating one or more examples 900 of RACH transmission procedures in higher bands, in accordance with the present disclosure. As shown in FIG. 9, a base station 110 and a UE 120 may communicate with one another in a wireless network (e.g., wireless network 100) to perform a four-step RACH procedure. Furthermore, as described herein, the four-step RACH procedure may be associated with a random access configuration that permits a PRACH preamble to have a cyclic prefix that exceeds a full symbol duration that depends on a subcarrier spacing used in a cell associated with the base station 110.

As shown in FIG. 9, and by reference number 910, the UE 120 may transmit, and the base station 110 may receive, a msg1 communication including a PRACH preamble with a cyclic prefix that is permitted to exceed a full symbol duration, as described in further detail above. As further shown in FIG. 9, and by reference number 920, the base station 110 may transmit, and the UE 120 may receive, a msg2 communication including a RAR that provides initial timing advance information. For example, as described above, the initial timing advance information may indicate a value of t, which is a timing advance within a full symbol duration that the base station 110 is able to detect unambiguously based on a time when the PRACH preamble is received. Accordingly, as further shown in FIG. 9, and by reference number 930, the UE 120 may transmit a msg3 communication using the initial timing advance indicated in the msg2 communication. Accordingly, as shown by reference number 940, the base station 110 may attempt to detect the msg3 communication with the initial timing advance (e.g., assuming that k has a value of 0).

As further shown by reference number 950, the base station 110 may transmit, and the UE 120 may receive, a PDCCH communication including downlink control information (DCI) triggering a retransmission of the msg3 communication with updated timing advance information (e.g., with k having a value of 1) if the base station 110 is unable to detect the msg3 communication with the initial timing advance. Accordingly, as shown by reference number 960, the UE 120 may retransmit the msg3 communication with the updated timing advance. In some aspects, this exchange may be repeated until the base station 110 is able to successfully detect the msg3 communication. Accordingly, in this case, the UE 120 may transmit the msg3 communication after successfully detecting the msg2 communication, and may then monitor a PDCCH for either the DCI triggering the retransmission of the msg3 communication or a msg4 PDCCH communication scheduling a msg4 PDSCH communication. In this way, the base station 110 may transmit one or more PDCCH communications to trigger one or more retransmissions of the msg3 communication with different timing advances until the msg3 communication is successfully detected. In some aspects, the initial timing advance may be based on k having a value of 0, and each PDCCH including DCI to trigger a retransmission of the msg3 communication may include a k value (ranging from 1 to M) to indicate the updated timing advance. For example, in some aspects, the k value may be indicated in a reserved field of a HARQ process identifier (e.g., a four-bit HARQ process number for a temporary cell radio network temporary identifier (TC-RNTI)). Alternatively, a time domain resource assignment (TDRA) table may include different entries that correspond to different k values, and the PDCCH may indicate one of the entries in the TDRA table.

As further shown in FIG. 9, and by reference number 970, the base station 110 may transmit, and the UE 120 may receive, a msg4 communication after the base station 110 is able to successfully detect the msg3 communication. For example, if the base station 110 is able to detect the msg3 communication with the initial timing advance, the base station 110 would not transmit the PDCCH communication to trigger a retransmission of the msg3 communication and would instead transmit the msg4 communication as a reply to the msg3 communication transmitted with the initial timing advance. Alternatively, if the base station 110 is unable to detect the msg3 communication with the initial timing advance but successfully detects a subsequent msg3 communication with a different timing advance, the base station 110 would transmit the msg4 communication as a reply to the msg3 communication that was successfully detected. Accordingly, as further shown in FIG. 9, and by reference number 980, subsequent uplink transmissions from the UE 120 to the base station 110, including an acknowledgement for the msg4 communication, may be transmitted according to the updated timing advance information, which may correspond to the timing advance that was used for a msg3 communication that was successfully detected by the base station 110 (e.g., the msg3 communication transmitted by the UE 120 just prior to the msg4 communication).

As indicated above, FIG. 9 is provided as an example. Other examples may differ from what is described with respect to FIG. 9.

Figure 10A:
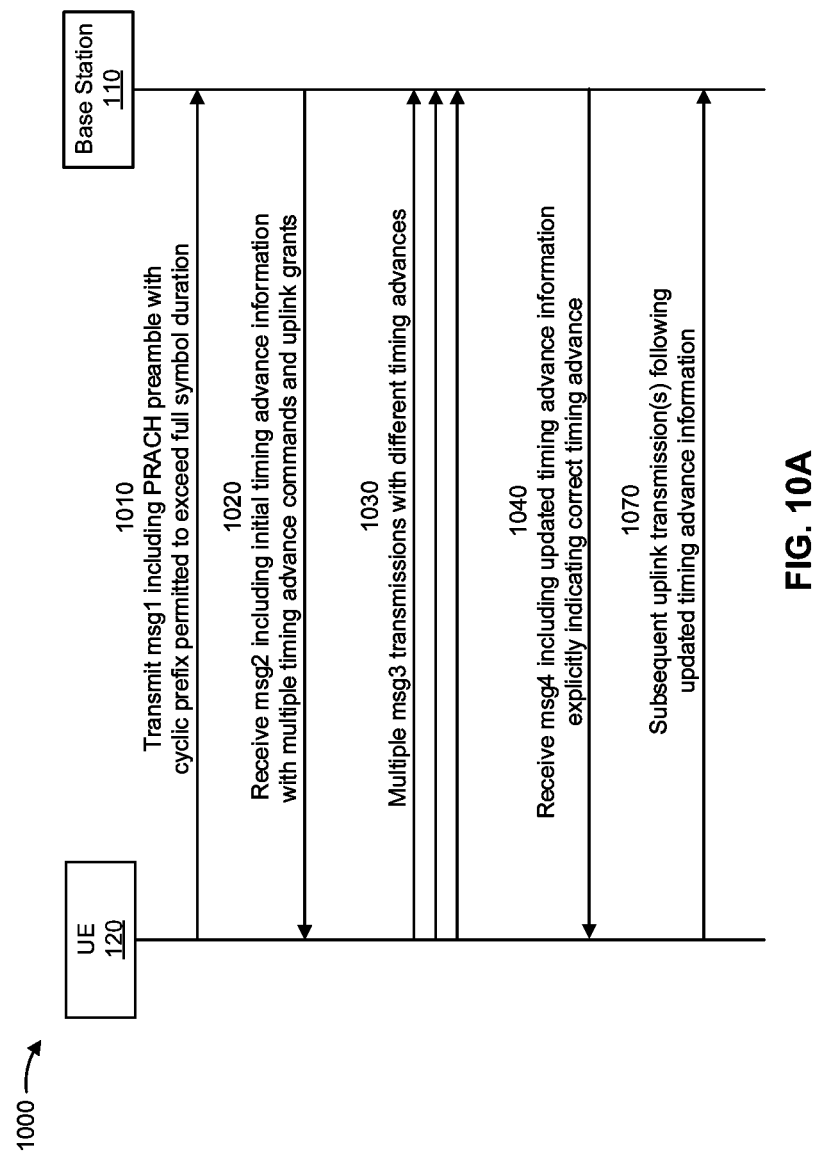
Figure 10B:
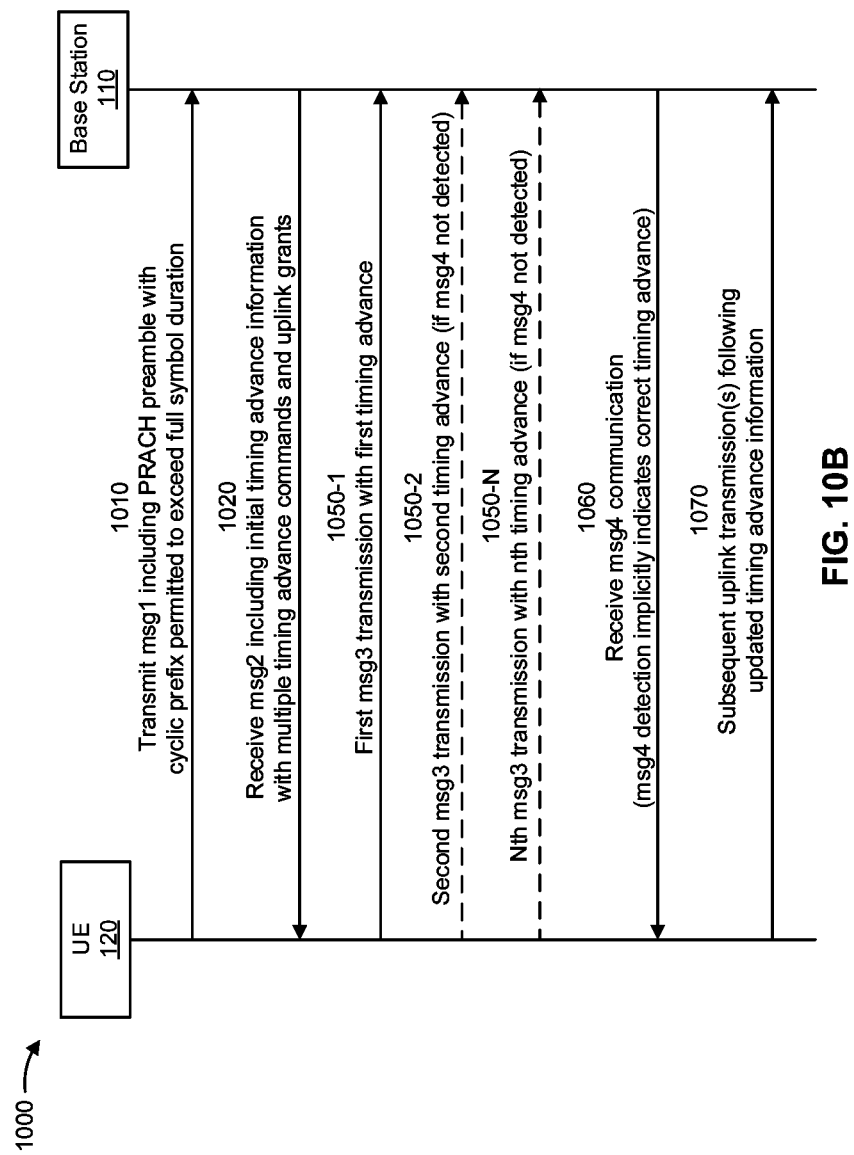

FIGS. 10A-10B are diagrams illustrating one or more examples 1000 of RACH transmission procedures in higher bands, in accordance with the present disclosure. As shown in FIGS. 10A-10B, a base station 110 and a UE 120 may communicate with one another in a wireless network (e.g., wireless network 100) to perform a four-step RACH procedure. Furthermore, as described herein, the four-step RACH procedure may be associated with a random access configuration that permits a PRACH preamble to have a cyclic prefix that exceeds a full symbol duration that depends on a subcarrier spacing used in a cell associated with the base station 110.

As shown in FIGS. 10A-10B, and by reference number 1010, the UE 120 may transmit, and the base station 110 may receive, a msg1 communication including a PRACH preamble with a cyclic prefix that is permitted to exceed a full symbol duration, as described in further detail above. As further shown in FIGS. 10A-10B, and by reference number 1020, the base station 110 may transmit, and the UE 120 may receive, a msg2 communication including initial timing advance information providing multiple timing advance commands (e.g., with timing advances of t+k/SCS, including multiple different values for k). Furthermore, as shown, the msg2 communication may include multiple uplink grants (e.g., different uplink resources) to permit the UE 120 to transmit a msg3 communication in multiple repetitions based on the multiple timing advance commands.

For example, as shown in FIG. 10A, and by reference number 1030, the UE 120 may transmit, and the base station 110 may receive, multiple repetitions of the msg3 communication that are transmitted with different timing advances (e.g., with a first timing advance of t, a second timing advance of t+1/SCS, a third timing advance of t+2/SCS, and/or the like). In this way, the multiple repetitions of the msg3 communication may increase coverage and reliability of the msg3 communication in addition to ensuring that the base station 110 will be able to successfully detect the msg3 communication, at least one of which will be transmitted with the correct timing. Accordingly, as further shown in FIG. 10A, and by reference number 1040, the base station 110 may transmit, and the UE 120 may receive, a msg4 communication that includes updated timing advance information. For example, in some aspects, the msg4 communication may explicitly indicate the k value to be used for subsequent uplink transmissions based on one of the multiple repetitions of the msg3 communication successfully detected by the base station 110.

Alternatively, as shown in FIG. 10B, and by reference number 1050-1, the UE 120 may transmit, and the base station 110 may receive, a first transmission of the msg3 communication with a first timing advance. In this case, the random access configuration may indicate that a msg4 transmission occasion does not overlap with a transmission occasion for each msg3 communication. For example, if the base station 110 is able to successfully detect the first transmission of the msg3 communication with the first timing advance, the base station 110 may transmit a msg4 communication as a reply to the first transmission of the msg3 communication before a transmission occasion for a next msg3 communication. Accordingly, if the UE 120 does not detect a msg4 communication before the transmission occasion for the next msg3 communication, the UE 120 may retransmit the msg3 communication with a different timing advance. For example, in FIG. 10B, reference numbers 1050-2 and 1050-N illustrate an example where the UE 120 transmits a second msg3 communication (e.g., with a timing advance of t+1/SCS) and an Nth msg3 communication (e.g., with a timing advance of t+(N−1)/SCS) based at least in part on a failure to detect a msg4 communication prior to the corresponding msg3 transmission occasion. In this case, as further shown in FIG. 10B, and by reference number 1060, the base station 110 may transmit, and the UE 120 may receive, a msg4 communication that implicitly indicates updated timing advance information. For example, in some aspects, the msg4 communication may implicitly indicate the k value to be used for subsequent uplink transmissions based on the timing advance that was used for the msg3 communication that was successfully detected by the base station 110 (e.g., the msg3 communication transmitted by the UE 120 just prior to the msg4 communication).

Accordingly, as further shown in FIGS. 10A-10B, and by reference number 1070, subsequent uplink transmissions from the UE 120 to the base station 110, including an acknowledgement for the msg4 communication, may be transmitted according to the updated timing advance information.

As indicated above, FIGS. 10A-10B are provided as one or more examples. Other examples may differ from what is described with respect to FIGS. 10A-10B.

Figure 11:
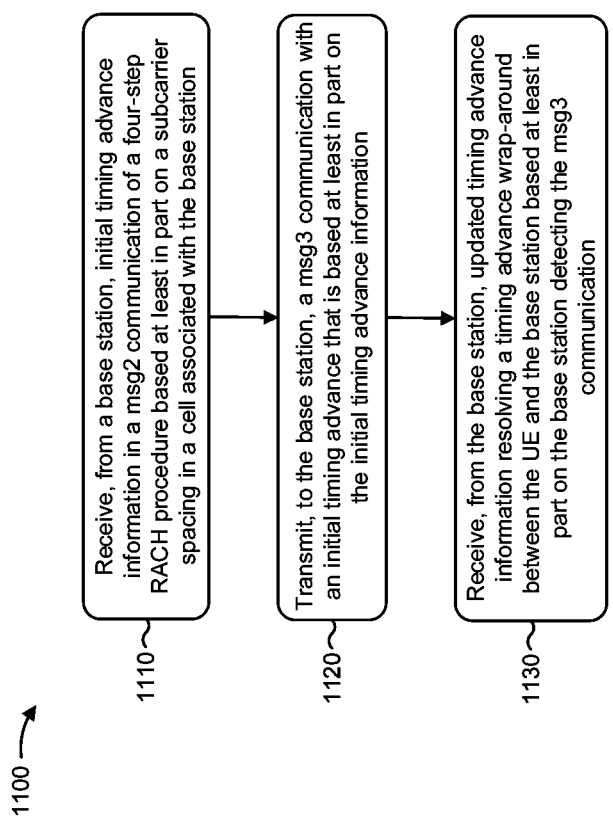
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 and/or the like) performs operations associated with RACH transmission procedures in higher bands.

As shown in FIG. 11, in some aspects, process 1100 may include receiving, from a base station, initial timing advance information in a msg2 communication of a four-step RACH procedure based at least in part on a subcarrier spacing in a cell associated with the base station (block 1110). For example, the UE may receive (e.g., using antenna 252, DEMOD 254, MIMO detector 256, receive processor 258, controller/processor 280, memory 282, and/or the like), from a base station, initial timing advance information in a msg2 communication of a four-step RACH procedure based at least in part on a subcarrier spacing in a cell associated with the base station, as described above.

As further shown in FIG. 11, in some aspects, process 1100 may include transmitting, to the base station, a msg3 communication with an initial timing advance that is based at least in part on the initial timing advance information (block 1120). For example, the UE (e.g., using controller/ processor 280, transmit processor 264, TX MIMO processor 266, MOD 254, antenna 252, and/or the like) may transmit, to the base station, a msg3 communication with an initial timing advance that is based at least in part on the initial timing advance information, as described above.

As further shown in FIG. 11, in some aspects, process 1100 may include receiving, from the base station, updated timing advance information resolving a timing advance wrap-around between the UE and the base station based at least in part on the base station detecting the msg3 communication (block 1130). For example, the UE (e.g., using antenna 252, DEMOD 254, MIMO detector 256, receive processor 258, controller/processor 280, memory 282, and/ or the like) may receive, from the base station, updated timing advance information resolving a timing advance wrap-around between the UE and the base station based at least in part on the base station detecting the msg3 communication, as described above.

Process 1100 may include additional aspects, such as any single aspect or any combination of aspects described below and/or in connection with one or more other processes described elsewhere herein.

In a first aspect, the initial timing advance information indicates the initial timing advance to be used for the msg3 communication within a full symbol duration that is based at least in part on the subcarrier spacing.

In a second aspect, alone or in combination with the first aspect, the updated timing advance information includes a non-negative integer value indicating a time to be added to the initial timing advance used for the msg3 communication based at least in part on the full symbol duration.

In a third aspect, alone or in combination with one or more of the first and second aspects, the base station detects the msg3 communication according to multiple timing hypotheses including an aligned timing hypothesis based at least in part on the initial timing advance and one or more additional timing hypotheses that are based at least in part on one or more possible values for the timing advance wrap-around between the UE and the base station.

In a fourth aspect, alone or in combination with one or more of the first through third aspects, the base station attempts to detect one or more of a DMRS or a PUSCH associated with the msg3 communication according to the multiple timing hypotheses.

In a fifth aspect, alone or in combination with one or more of the first through fourth aspects, process 1100 includes transmitting, to the base station, a timing resolution reference signal prior to the msg3 communication, and the base station may attempt to detect the msg3 communication according to the multiple timing hypotheses based at least in part on timing information determined from the timing resolution reference signal.

In a sixth aspect, alone or in combination with one or more of the first through fifth aspects, resources assigned to one or more of the timing resolution reference signal or the msg3 communication are separated from one or more other uplink signals by one or more symbol gaps in time and by one or more guard resource elements or resource blocks.

In a seventh aspect, alone or in combination with one or more of the first through sixth aspects, the updated timing advance information is received in a PDCCH or a PDSCH associated with a msg4 communication of the four-step RACH procedure.

In an eighth aspect, alone or in combination with one or more of the first through seventh aspects, process 1100 includes transmitting, to the base station, one or more uplink communications including an acknowledgement to the msg4 communication based at least in part on the updated timing advance information.

In a ninth aspect, alone or in combination with one or more of the first through eighth aspects, the updated timing advance information is received in a retransmission of the msg2 communication based at least in part on the base station failing to detect the msg3 communication with the initial timing advance.

In a tenth aspect, alone or in combination with one or more of the first through ninth aspects, process 1100 includes retransmitting the msg3 communication to the base station according to the updated timing advance information, and receiving, from the base station, a msg4 communication of the four-step RACH procedure based at least in part on the base station detecting the msg3 communication according to the updated timing advance information.

In an eleventh aspect, alone or in combination with one or more of the first through tenth aspects, the retransmission of the msg2 communication is received during a RAR window monitored by the UE for a duration that is based at least in part on a supported cell size associated with the base station.

In a twelfth aspect, alone or in combination with one or more of the first through eleventh aspects, the updated timing advance information is received in a PDCCH including DCI triggering a retransmission of the msg3 communication.

In a thirteenth aspect, alone or in combination with one or more of the first through twelfth aspects, the updated timing advance information is indicated in a HARQ process identifier field of the DCI triggering the retransmission of the msg3 communication.

In a fourteenth aspect, alone or in combination with one or more of the first through thirteenth aspects, the updated timing advance information is indicated by an entry in a TDRA table.

In a fifteenth aspect, alone or in combination with one or more of the first through fourteenth aspects, the initial timing advance information includes multiple timing advance commands and multiple resource allocations for the msg3 communication, and the msg3 communication is transmitted in multiple repetitions based at least in part on the multiple timing advance commands and the multiple resource allocations for the msg3 communication.

In a sixteenth aspect, alone or in combination with one or more of the first through fifteenth aspects, the updated timing advance information is explicitly indicated in a msg4 communication of the four-step RACH procedure based at least in part on the multiple repetitions of the msg3 communication.

In a seventeenth aspect, alone or in combination with one or more of the first through sixteenth aspects, the updated timing advance information is implicitly indicated by a msg4 communication of the four-step RACH procedure received as a reply to one of the multiple repetitions of the msg3 communication.

In an eighteenth aspect, alone or in combination with one or more of the first through seventeenth aspects, process 1100 includes receiving, from the base station, random access configuration information including a first PRACH numerology for a two-step RACH procedure and a second PRACH numerology for the four-step RACH procedure.

In a nineteenth aspect, alone or in combination with one or more of the first through eighteenth aspects, the first PRACH numerology is the same as a data numerology that is based at least in part on the subcarrier spacing in the cell associated with the base station, and the second PRACH numerology is smaller than the data numerology that is based at least in part on the subcarrier spacing in the cell associated with the base station.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
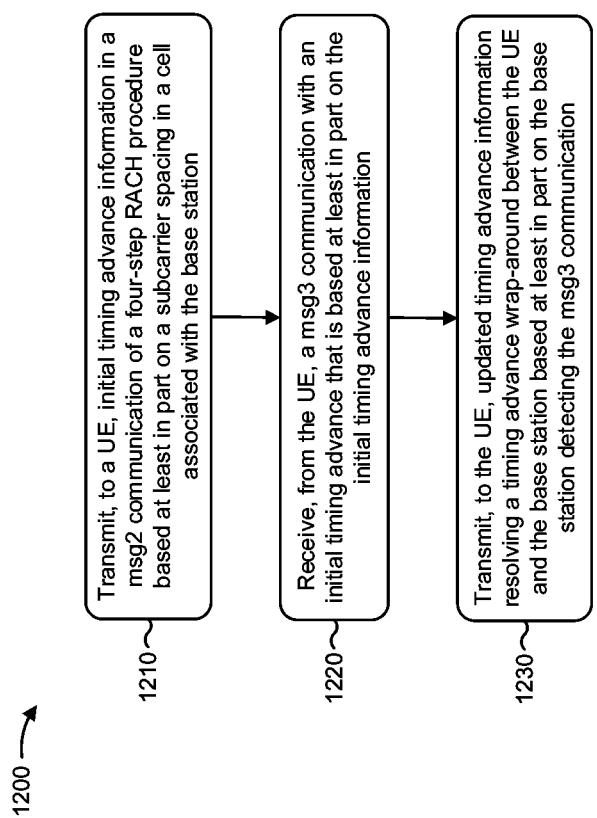
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 and/or the like) performs operations associated with RACH transmission procedures in higher bands.

As shown in FIG. 12, in some aspects, process 1200 may include transmitting, to a UE, initial timing advance information in a msg2 communication of a four-step RACH procedure based at least in part on a subcarrier spacing in a cell associated with the base station (block 1210). For example, the base station may transmit (e.g., using controller/processor 240, transmit processor 220, TX MIMO processor 230, MOD 232, antenna 234, and/or the like), to a UE, initial timing advance information in a msg2 communication of a four-step RACH procedure based at least in part on a subcarrier spacing in a cell associated with the base station, as described above.

As further shown in FIG. 12, in some aspects, process 1200 may include receiving, from the UE, a msg3 communication with an initial timing advance that is based at least in part on the initial timing advance information (block 1220). For example, the base station may receive (e.g., using antenna 234, DEMOD 232, MIMO detector 236, receive processor 238, controller/processor 240, and/or the like), from the UE, a msg3 communication with an initial timing advance that is based at least in part on the initial timing advance information, as described above.

As further shown in FIG. 12, in some aspects, process 1200 may include transmitting, to the UE, updated timing advance information resolving a timing advance wrap-around between the UE and the base station based at least in part on the base station detecting the msg3 communication (block 1230). For example, the base station may transmit (e.g., using controller/processor 240, transmit processor 220, TX MIMO processor 230, MOD 232, antenna 234, and/or the like), to the UE, updated timing advance information resolving a timing advance wrap-around between the UE and the base station based at least in part on the base station detecting the msg3 communication, as described above.

Process 1200 may include additional aspects, such as any single aspect or any combination of aspects described below and/or in connection with one or more other processes described elsewhere herein.

In a first aspect, the initial timing advance information indicates the initial timing advance to be used for the msg3 communication within a full symbol duration that is based at least in part on the subcarrier spacing.

In a second aspect, alone or in combination with the first aspect, the updated timing advance information includes a non-negative integer value indicating a time to be added to the initial timing advance used for the msg3 communication based at least in part on the full symbol duration.

In a third aspect, alone or in combination with one or more of the first and second aspects, process 1200 includes detecting the msg3 communication according to multiple timing hypotheses including an aligned timing hypothesis based at least in part on the initial timing advance and one or more additional timing hypotheses that are based at least in part on one or more possible values for the timing advance wrap-around between the UE and the base station.

In a fourth aspect, alone or in combination with one or more of the first through third aspects, process 1200 includes attempting to detect one or more of a DMRS or a PUSCH associated with the msg3 communication according to the multiple timing hypotheses.

In a fifth aspect, alone or in combination with one or more of the first through fourth aspects, process 1200 includes receiving, from the UE, a timing resolution reference signal prior to the msg3 communication, and attempting to detect the msg3 communication according to the multiple timing hypotheses based at least in part on timing information determined from the timing resolution reference signal.

In a sixth aspect, alone or in combination with one or more of the first through fifth aspects, resources assigned to one or more of the timing resolution reference signal or the msg3 communication are separated from one or more other uplink signals by one or more symbol gaps in time and by one or more guard resource elements or resource blocks.

In a seventh aspect, alone or in combination with one or more of the first through sixth aspects, the updated timing advance information is transmitted in a PDCCH or a PDSCH associated with a msg4 communication of the four-step RACH procedure.

In an eighth aspect, alone or in combination with one or more of the first through seventh aspects, process 1200 includes receiving, from the UE, one or more uplink communications including an acknowledgement to the msg4 communication based at least in part on the updated timing advance information.

In a ninth aspect, alone or in combination with one or more of the first through eighth aspects, the updated timing advance information is transmitted in a retransmission of the msg2 communication based at least in part on a failure to detect the msg3 communication with the initial timing advance.

In a tenth aspect, alone or in combination with one or more of the first through ninth aspects, process 1200 includes receiving, from the UE, a retransmission of the msg3 communication according to the updated timing advance information, and transmitting, to the UE, a msg4 communication of the four-step RACH procedure based at least in part on detecting the retransmission of the msg3 communication according to the updated timing advance information.

In an eleventh aspect, alone or in combination with one or more of the first through tenth aspects, the retransmission of the msg2 communication is transmitted during a RAR window monitored by the UE for a duration that is based at least in part on a supported cell size associated with the base station.

In a twelfth aspect, alone or in combination with one or more of the first through eleventh aspects, the updated timing advance information is transmitted in a PDCCH including DCI triggering a retransmission of the msg3 communication.

In a thirteenth aspect, alone or in combination with one or more of the first through twelfth aspects, the updated timing advance information is indicated in a HARQ process identifier field of the DCI triggering the retransmission of the msg3 communication.

In a fourteenth aspect, alone or in combination with one or more of the first through thirteenth aspects, the updated timing advance information is indicated by an entry in a TDRA table.

In a fifteenth aspect, alone or in combination with one or more of the first through fourteenth aspects, the initial timing advance information includes multiple timing advance commands and multiple resource allocations for the msg3 communication, and the msg3 communication is received in multiple repetitions based at least in part on the multiple timing advance commands and the multiple resource allocations for the msg3 communication.

In a sixteenth aspect, alone or in combination with one or more of the first through fifteenth aspects, the updated timing advance information is explicitly indicated in a msg4 communication of the four-step RACH procedure based at least in part on the multiple repetitions of the msg3 communication.

In a seventeenth aspect, alone or in combination with one or more of the first through sixteenth aspects, the updated timing advance information is implicitly indicated by a msg4 communication of the four-step RACH procedure transmitted as a reply to one of the multiple repetitions of the msg3 communication.

In an eighteenth aspect, alone or in combination with one or more of the first through seventeenth aspects, process 1200 includes transmitting, to the UE, random access configuration information including a first PRACH numerology for a two-step RACH procedure and a second PRACH numerology for the four-step RACH procedure.

In a nineteenth aspect, alone or in combination with one or more of the first through eighteenth aspects, the first PRACH numerology is the same as a data numerology that is based at least in part on the subcarrier spacing in the cell associated with the base station, and the second PRACH numerology is smaller than the data numerology that is based at least in part on the subcarrier spacing in the cell associated with the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some aspects of the present disclosure:

Aspect 1: A method of wireless communication performed by a UE, comprising: receiving, from a base station, initial timing advance information in a msg2 communication of a four-step RACH procedure based at least in part on a subcarrier spacing in a cell associated with the base station; transmitting, to the base station, a msg3 communication with an initial timing advance that is based at least in part on the initial timing advance information; and receiving, from the base station, updated timing advance information resolving a timing advance wrap-around between the UE and the base station based at least in part on the base station detecting the msg3 communication.

Aspect 2: The method of aspect 1, wherein the initial timing advance information indicates the initial timing advance to be used for the msg3 communication within a full symbol duration that is based at least in part on the subcarrier spacing.

Aspect 3: The method of aspect 2, wherein the updated timing advance information includes a non-negative integer value indicating a time to be added to the initial timing advance used for the msg3 communication based at least in part on the full symbol duration.

Aspect 4: The method of any of aspects 1-3, wherein the base station detects the msg3 communication according to multiple timing hypotheses including an aligned timing hypothesis based at least in part on the initial timing advance and one or more additional timing hypotheses that are based at least in part on one or more possible values for the timing advance wrap-around between the UE and the base station.

Aspect 5: The method of aspect 4, wherein the base station attempts to detect one or more of a DMRS or a PUSCH associated with the msg3 communication according to the multiple timing hypotheses.

Aspect 6: The method of any of aspects 4-5, further comprising: transmitting, to the base station, a timing resolution reference signal prior to the msg3 communication, wherein the base station attempts to detect the msg3 communication according to the multiple timing hypotheses based at least in part on timing information determined from the timing resolution reference signal.

Aspect 7: The method of aspect 6, wherein resources assigned to one or more of the timing resolution reference signal or the msg3 communication are separated from one or more other uplink signals by one or more symbol gaps in time and by one or more guard resource elements or resource blocks.

Aspect 8: The method of any of aspects 1-7, wherein the updated timing advance information is received in a PDCCH or a PDSCH associated with a msg4 communication of the four-step RACH procedure.

Aspect 9: The method of aspect 8, further comprising: transmitting, to the base station, one or more uplink communications including an acknowledgement to the msg4 communication based at least in part on the updated timing advance information.

Aspect 10: The method of any of aspects 1-9, wherein the updated timing advance information is received in a retransmission of the msg2 communication based at least in part on the base station failing to detect the msg3 communication with the initial timing advance.

Aspect 11: The method of aspect 10, further comprising: retransmitting the msg3 communication to the base station according to the updated timing advance information; and receiving, from the base station, a msg4 communication of the four-step RACH procedure based at least in part on the base station detecting the msg3 communication according to the updated timing advance information.

Aspect 12: The method of any of aspects 10-11, wherein the retransmission of the msg2 communication is received during a RAR window monitored by the UE for a duration that is based at least in part on a supported cell size associated with the base station.

Aspect 13: The method of any of aspects 1-12, wherein the updated timing advance information is received in a PDCCH including DCI triggering a retransmission of the msg3 communication.

Aspect 14: The method of aspect 13, wherein the updated timing advance information is indicated in a HARQ process identifier field of the DCI triggering the retransmission of the msg3 communication.

Aspect 15: The method of any of aspects 13-14, wherein the updated timing advance information is indicated by an entry in a TDRA table.

Aspect 16: The method of any of aspects 1-15, wherein the initial timing advance information includes multiple timing advance commands and multiple resource allocations for the msg3 communication, and wherein the msg3 communication is transmitted in multiple repetitions based at least in part on the multiple timing advance commands and the multiple resource allocations for the msg3 communication.

Aspect 17: The method of aspect 16, wherein the updated timing advance information is explicitly indicated in a msg4 communication of the four-step RACH procedure based at least in part on the multiple repetitions of the msg3 communication.

Aspect 18: The method of any of aspects 16-17, wherein the updated timing advance information is implicitly indicated by a msg4 communication of the four-step RACH procedure received as a reply to one of the multiple repetitions of the msg3 communication.

Aspect 19: The method of any of aspects 1-18, further comprising: receiving, from the base station, random access configuration information including a first PRACH numerology for a two-step RACH procedure and a second PRACH numerology for the four-step RACH procedure.

Aspect 20: The method of aspect 19, wherein the first PRACH numerology is the same as a data numerology that is based at least in part on the subcarrier spacing in the cell associated with the base station, and wherein the second PRACH numerology is smaller than the data numerology that is based at least in part on the subcarrier spacing in the cell associated with the base station.

Aspect 21: A method of wireless communication performed by a base station, comprising: transmitting, to a UE, initial timing advance information in a msg2 communication of a four-step RACH procedure based at least in part on a subcarrier spacing in a cell associated with the base station; receiving, from the UE, a msg3 communication with an initial timing advance that is based at least in part on the initial timing advance information; and transmitting, to the UE, updated timing advance information resolving a timing advance wrap-around between the UE and the base station based at least in part on the base station detecting the msg3 communication.

Aspect 22: The method of aspect 21, wherein the initial timing advance information indicates the initial timing advance to be used for the msg3 communication within a full symbol duration that is based at least in part on the subcarrier spacing.

Aspect 23: The method of aspect 22, wherein the updated timing advance information includes a non-negative integer value indicating a time to be added to the initial timing advance used for the msg3 communication based at least in part on the full symbol duration.

Aspect 24: The method of any of aspects 21-23, further comprising: detecting the msg3 communication according to multiple timing hypotheses including an aligned timing hypothesis based at least in part on the initial timing advance and one or more additional timing hypotheses that are based at least in part on one or more possible values for the timing advance wrap-around between the UE and the base station.

Aspect 25: The method of aspect 24, further comprising: attempting to detect one or more of a DMRS or a PUSCH associated with the msg3 communication according to the multiple timing hypotheses.

Aspect 26: The method of any of aspects 24-25, further comprising: receiving, from the UE, a timing resolution reference signal prior to the msg3 communication; and attempting to detect the msg3 communication according to the multiple timing hypotheses based at least in part on timing information determined from the timing resolution reference signal.

Aspect 27: The method of aspect 26, wherein resources assigned to one or more of the timing resolution reference signal or the msg3 communication are separated from one or more other uplink signals by one or more symbol gaps in time and by one or more guard resource elements or resource blocks.

Aspect 28: The method of any of aspects 21-27, wherein the updated timing advance information is transmitted in a PDCCH or a PDSCH channel associated with a msg4 communication of the four-step RACH procedure.

Aspect 29: The method of aspect 28, further comprising: receiving, from the UE, one or more uplink communications including an acknowledgement to the msg4 communication based at least in part on the updated timing advance information.

Aspect 30: The method of any of aspects 21-29, wherein the updated timing advance information is transmitted in a retransmission of the msg2 communication based at least in part on a failure to detect the msg3 communication with the initial timing advance.

Aspect 31: The method of aspect 30, further comprising: receiving, from the UE, a retransmission of the msg3 communication according to the updated timing advance information; and transmitting, to the UE, a msg4 communication of the four-step RACH procedure based at least in part on detecting the retransmission of the msg3 communication according to the updated timing advance information.

Aspect 32: The method of any of aspects 30-31, wherein the retransmission of the msg2 communication is transmitted during a RAR window monitored by the UE for a duration that is based at least in part on a supported cell size associated with the base station.

Aspect 33: The method of any of aspects 21-32, wherein the updated timing advance information is transmitted in a PDCCH including DCI triggering a retransmission of the msg3 communication.

Aspect 34: The method of aspect 33, wherein the updated timing advance information is indicated in a HARQ process identifier field of the DCI triggering the retransmission of the msg3 communication.

Aspect 35: The method of any of aspects 33-34, wherein the updated timing advance information is indicated by an entry in a TDRA table.

Aspect 36: The method of any of aspects 21-35, wherein the initial timing advance information includes multiple timing advance commands and multiple resource allocations for the msg3 communication, and wherein the msg3 communication is received in multiple repetitions based at least in part on the multiple timing advance commands and the multiple resource allocations for the msg3 communication.

Aspect 37: The method of aspect 36, wherein the updated timing advance information is explicitly indicated in a msg4 communication of the four-step RACH procedure based at least in part on the multiple repetitions of the msg3 communication.

Aspect 38: The method of any of aspects 36-37, wherein the updated timing advance information is implicitly indicated by a msg4 communication of the four-step RACH procedure transmitted as a reply to one of the multiple repetitions of the msg3 communication.

Aspect 39: The method of any of aspects 21-38, further comprising: transmitting, to the UE, random access configuration information including a first PRACH numerology for a two-step RACH procedure and a second PRACH numerology for the four-step RACH procedure.

Aspect 40: The method of aspect 39, wherein the first PRACH numerology is the same as a data numerology that is based at least in part on the subcarrier spacing in the cell associated with the base station, and wherein the second PRACH numerology is smaller than the data numerology that is based at least in part on the subcarrier spacing in the cell associated with the base station.

Aspect 41: An apparatus for wireless communication at a device, comprising a processor; memory coupled with the processor; and instructions stored in the memory and executable by the processor to cause the apparatus to perform the method of one or more aspects of aspects 1-20.

Aspect 42: A device for wireless communication, comprising a memory and one or more processors coupled to the memory, the memory and the one or more processors configured to perform the method of one or more aspects of aspects 1-20.

Aspect 43: An apparatus for wireless communication, comprising at least one means for performing the method of one or more aspects of aspects 1-20.

Aspect 44: A non-transitory computer-readable medium storing code for wireless communication, the code comprising instructions executable by a processor to perform the method of one or more aspects of aspects 1-20.

Aspect 45: A non-transitory computer-readable medium storing a set of instructions for wireless communication, the set of instructions comprising one or more instructions that, when executed by one or more processors of a device, cause the device to perform the method of one or more aspects of aspects 1-20.

Aspect 46: An apparatus for wireless communication at a device, comprising a processor; memory coupled with the processor; and instructions stored in the memory and executable by the processor to cause the apparatus to perform the method of one or more aspects of aspects 21-40.

Aspect 47: A device for wireless communication, comprising a memory and one or more processors coupled to the memory, the memory and the one or more processors configured to perform the method of one or more aspects of aspects 21-40.

Aspect 48: An apparatus for wireless communication, comprising at least one means for performing the method of one or more aspects of aspects 21-40.

Aspect 49: A non-transitory computer-readable medium storing code for wireless communication, the code comprising instructions executable by a processor to perform the method of one or more aspects of aspects 21-40.

Aspect 50: A non-transitory computer-readable medium storing a set of instructions for wireless communication, the set of instructions comprising one or more instructions that, when executed by one or more processors of a device, cause the device to perform the method of one or more aspects of aspects 21-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, wherein the one or more processors are configured to:
receive, from a network entity, initial timing advance information in a msg2 communication of a four-step random access channel (RACH) procedure based at least in part on a subcarrier spacing in a cell associated with the network entity;
transmit, to the network entity, a msg3 communication with an initial timing advance that is based at least in part on the initial timing advance information; and
receive, from the network entity and based at least in part on a detection failure corresponding to the msg3 communication, a retransmission of the msg2 communication including updated timing advance information configured to resolve a timing advance value between the UE and the network entity.

2. The UE of claim 1, wherein the initial timing advance information indicates the initial timing advance to be used for the msg3 communication within a full symbol duration that is based at least in part on the subcarrier spacing, and wherein the updated timing advance information includes a non-negative integer value indicating a time to be added to the initial timing advance used for the msg3 communication based at least in part on the full symbol duration.

3. The UE of claim 1, wherein the msg3 communication is detected according to multiple timing hypotheses including an aligned timing hypothesis based at least in part on the initial timing advance and one or more additional timing hypotheses that are based at least in part on one or more possible values for the timing advance value between the UE and the network entity.

4. The UE of claim 3, wherein the one or more processors are further configured to:
transmit, to the network entity, a timing resolution reference signal prior to the msg3 communication, wherein an attempt to detect the msg3 communication according to the multiple timing hypotheses is based at least in part on timing information determined from the timing resolution reference signal.

5. The UE of claim 1, wherein the updated timing advance information is first updated timing advance information, and wherein the one or more processors are further configured to receive second updated timing advance information in a physical downlink control channel or a physical downlink shared channel associated with a msg4 communication of the four-step RACH procedure.

6. The UE of claim 1, wherein the one or more processors, to receive the retransmission of the msg2 communication, are configured to receive the retransmission of the msg2 communication during a random access response window monitored by the UE for a duration that is based at least in part on a supported cell size associated with the network entity.

7. The UE of claim 1, wherein the one or more processors, to receive the updated timing advance information, are configured to receive the updated timing advance information in a physical downlink control channel including downlink control information (DCI) triggering a retransmission of the msg3 communication.

8. The UE of claim 7, wherein the updated timing advance information is indicated by an entry in a time domain resource assignment table or a hybrid automatic repeat request process identifier field of the DCI triggering the retransmission of the msg3 communication.

9. The UE of claim 1, wherein the updated timing advance information is first updated timing advance information, wherein the initial timing advance information includes multiple timing advance commands and multiple resource allocations for the msg3 communication, wherein, to transmit the msg3 communication, the one or more processors are configured to transmit the msg3 communication in multiple repetitions based at least in part on the multiple timing advance commands and the multiple resource allocations for the msg3 communication, and wherein second updated timing advance information is explicitly or implicitly indicated in a msg4 communication of the four-step RACH procedure based at least in part on the multiple repetitions of the msg3 communication.

10. The UE of claim 1, wherein the one or more processors are further configured to:
receive, from the network entity, random access configuration information including a first physical RACH (PRACH) numerology for a two-step RACH procedure and a second PRACH numerology for the four-step RACH procedure, wherein the first PRACH numerology is the same as a data numerology that is based at least in part on the subcarrier spacing in the cell associated with the network entity, and wherein the second PRACH numerology is smaller than the data numerology that is based at least in part on the subcarrier spacing in the cell associated with the network entity.

11. A network entity for wireless communication, comprising:
a memory; and
one or more processors coupled to the memory, wherein the one or more processors are configured to:
transmit, to a user equipment (UE), initial timing advance information in a msg2 communication of a four-step random access channel (RACH) procedure based at least in part on a subcarrier spacing in a cell associated with the network entity;
transmit, to the UE and based at least in part on a failure to detect a msg3 communication, a retransmission of the msg2 communication including updated timing advance information configured to resolve a timing advance value between the UE and the network entity; and
receive, from the UE, the msg3 communication with a timing advance that is based at least in part on the updated timing advance information.

12. The network entity of claim 11, wherein the initial timing advance information indicates an initial timing advance to be used for the msg3 communication within a full symbol duration that is based at least in part on the subcarrier spacing, and wherein the updated timing advance information includes a non-negative integer value indicating a time to be added to the initial timing advance used for the msg3 communication based at least in part on the full symbol duration.

13. The network entity of claim 11, wherein the one or more processors are further configured to:
detect the msg3 communication according to multiple timing hypotheses including an aligned timing hypothesis based at least in part on the timing advance and one or more additional timing hypotheses that are based at least in part on one or more possible values for the timing advance value between the UE and the network entity.

14. The network entity of claim 13, wherein the one or more processors are further configured to:
receive, from the UE, a timing resolution reference signal prior to the msg3 communication; and
attempt to detect the msg3 communication according to the multiple timing hypotheses based at least in part on timing information determined from the timing resolution reference signal.

15. The network entity of claim 11, wherein the updated timing advance information is first updated timing advance information, and
wherein the one or more processors are further configured to transmit second updated timing advance information in a physical downlink control channel or a physical downlink shared channel associated with a msg4 communication of the four-step RACH procedure.

16. The network entity of claim 11, wherein the one or more processors, to transmit the retransmission of the msg2 communication, are configured to transmit the retransmission of the msg2 communication during a random access response window monitored by the UE for a duration that is based at least in part on a supported cell size associated with the network entity.

17. The network entity of claim 11, wherein, the one or more processors, to transmit the updated timing advance information, are configured to transmit the updated timing advance information in a physical downlink control channel including downlink control information (DCI) triggering a retransmission of the msg3 communication.

18. The network entity of claim 17, wherein the updated timing advance information is indicated by an entry in a time domain resource assignment table or a hybrid automatic repeat request process identifier field of the DCI triggering the retransmission of the msg3 communication.

19. The network entity of claim 11, wherein the updated timing advance information is first updated timing advance information, wherein the initial timing advance information includes multiple timing advance commands and multiple resource allocations for the msg3 communication, wherein the one or more processors, to receive the msg3 communication, are configured to receive the msg3 communication in multiple repetitions based at least in part on the multiple timing advance commands and the multiple resource allocations for the msg3 communication, and wherein second updated timing advance information is explicitly or implicitly indicated in a msg4 communication of the four-step RACH procedure based at least in part on the multiple repetitions of the msg3 communication.

20. The network entity of claim 11, wherein the one or more processors are further configured to:
transmit, to the UE, random access configuration information including a first physical RACH (PRACH) numerology for a two-step RACH procedure and a second PRACH numerology for the four-step RACH procedure, wherein the first PRACH numerology is the same as a data numerology that is based at least in part on the subcarrier spacing in the cell associated with the network entity, and wherein the second PRACH numerology is smaller than the data numerology that is based at least in part on the subcarrier spacing in the cell associated with the network entity.

21. A method of wireless communication performed by a user equipment (UE), comprising:
receiving, from a network entity, initial timing advance information in a msg2 communication of a four-step random access channel (RACH) procedure based at least in part on a subcarrier spacing in a cell associated with the network entity;
transmitting, to the network entity, a msg3 communication with an initial timing advance that is based at least in part on the initial timing advance information; and
receiving, from the network entity and based at least in part on a detection failure corresponding to the msg3 communication, a retransmission of the msg2 communication including updated timing advance information resolving a timing advance value between the UE and the network entity.

22. The method of claim 21, wherein the initial timing advance information indicates the initial timing advance to be used for the msg3 communication within a full symbol duration that is based at least in part on the subcarrier spacing, and wherein the updated timing advance information includes a non-negative integer value indicating a time to be added to the initial timing advance used for the msg3 communication based at least in part on the full symbol duration.

23. The method of claim 21, wherein the retransmission of the msg2 communication is received during a random access response window monitored by the UE for a duration that is based at least in part on a supported cell size associated with the network entity.

24. The method of claim 21, wherein the updated timing advance information is received in a physical downlink control channel including downlink control information triggering a retransmission of the msg3 communication.

25. The method of claim 21, wherein the updated timing advance information is first updated timing advance information, wherein the initial timing advance information includes multiple timing advance commands and multiple resource allocations for the msg3 communication, wherein the msg3 communication is transmitted in multiple repetitions based at least in part on the multiple timing advance commands and the multiple resource allocations for the msg3 communication, and wherein second updated timing advance information is explicitly or implicitly indicated in a msg4 communication of the four-step RACH procedure based at least in part on the multiple repetitions of the msg3 communication.

26. A method of wireless communication performed by a network entity, comprising:
transmitting, to a user equipment (UE), initial timing advance information in a msg2 communication of a four-step random access channel (RACH) procedure based at least in part on a subcarrier spacing in a cell associated with the network entity;
transmitting, to the UE and based at least in part on the network entity failing to detect a msg3 communication, a retransmission of the msg2 communication including updated timing advance information resolving a timing advance value between the UE and the network entity; and
receiving, from the UE, the msg3 communication with a timing advance that is based at least in part on the updated timing advance information.

27. The method of claim 26, comprising:
detecting the msg3 communication according to multiple timing hypotheses including an aligned timing hypothesis based at least in part on the initial timing advance and one or more additional timing hypotheses that are based at least in part on one or more possible values for the timing advance value between the UE and the network entity.

28. The method of claim 26, wherein the retransmission of the msg2 communication is transmitted during a random access response window monitored by the UE for a duration that is based at least in part on a supported cell size associated with the network entity.

29. The method of claim 26, wherein the updated timing advance information is transmitted in a physical downlink control channel including downlink control information triggering a retransmission of the msg3 communication.

30. The method of claim 26, wherein the updated timing advance information is first updated timing advance information, wherein the initial timing advance information includes multiple timing advance commands and multiple resource allocations for the msg3 communication, wherein the msg3 communication is received in multiple repetitions based at least in part on the multiple timing advance commands and the multiple resource allocations for the msg3 communication, and wherein second updated timing advance information is explicitly or implicitly indicated in a msg4 communication of the four-step RACH procedure based at least in part on the multiple repetitions of the msg3 communication.

* * * * *